(12) United States Patent
McCaughan et al.

(10) Patent No.: US 9,298,320 B2
(45) Date of Patent: Mar. 29, 2016

(54) TOUCH SENSITIVE DISPLAY DEVICES

(75) Inventors: Gareth John McCaughan, Cambridgeshire (GB); Paul Richard Routley, Cambridgeshire (GB); John Andrew, Cambridgeshire (GB); Euan Christopher Smith, Cambridgeshire (GB); Adrian J. Cable, Cambridgeshire (GB)

(73) Assignee: Promethean Limited (GB)

( * ) Notice: Subject to any disclaimer, the term of this patent is extended or adjusted under 35 U.S.C. 154(b) by 0 days.

(21) Appl. No.: 14/126,267

(22) PCT Filed: Jun. 15, 2012

(86) PCT No.: PCT/GB2012/051384
§ 371 (c)(1),
(2), (4) Date: May 9, 2014

(87) PCT Pub. No.: WO2012/172364
PCT Pub. Date: Dec. 20, 2012

(65) Prior Publication Data
US 2014/0240293 A1    Aug. 28, 2014

Related U.S. Application Data

(60) Provisional application No. 61/508,857, filed on Jul. 18, 2011.

(30) Foreign Application Priority Data

Jun. 16, 2011    (GB) .................................... 1110156.5

(51) Int. Cl.
G06F 3/042    (2006.01)
G06F 3/03    (2006.01)
G06T 7/20    (2006.01)
(Continued)

(52) U.S. Cl.
CPC ............ *G06F 3/0425* (2013.01); *G06F 3/0304* (2013.01); *G06F 3/0426* (2013.01); *G06T 7/004* (2013.01); *G06T 7/208* (2013.01); *G06T 7/606* (2013.01); *G06F 2203/04104* (2013.01)

(58) Field of Classification Search
CPC combination set(s) only.
See application file for complete search history.

(56) References Cited

U.S. PATENT DOCUMENTS 6,614,422 B1    9/2003  Rafii
7,307,661 B2 *  12/2007  Lieberman et al. ........ 348/333.1
(Continued)

*Primary Examiner* — Van Chow
(74) *Attorney, Agent, or Firm* — Brient Globerman, LLC; Kyle M. Globerman

(57) ABSTRACT

A touch sensitive device, the device comprising: a touch sensor light source to project a plane of light above a surface; a camera directed to capture a touch sense image from a region including at least a portion of said plane of light, said touch sense image comprising light scattered from said plane of light by a plurality of said objects simultaneously approaching or touching said surface; a signal processor coupled to said camera, to process a said touch sense image from said camera to identify a lateral location of each of said objects; and an output object position output, to provide output object positions for said plurality of objects; and wherein said signal processor is further configured to: input a succession of said touch sense images; process each said touch sense image to identify a plurality of candidate object touch positions; and filter said candidate object touch positions from said successive touch sense images to link said candidate object touch positions to previously identified output object positions for said plurality of objects; and update said previously identified output object positions using said linked candidate object touch positions.

19 Claims, 17 Drawing Sheets

(51) Int. Cl.
*G06T 7/60* (2006.01)
*G06T 7/00* (2006.01)

(56) References Cited

U.S. PATENT DOCUMENTS

| | | | |
|---|---|---|---|
| 7,853,041 B2 * | 12/2010 | Shamaie | 382/103 |
| 7,893,924 B2 * | 2/2011 | Lieberman et al. | 345/156 |
| 8,810,527 B2 * | 8/2014 | Nakagawa | 345/173 |
| 8,902,161 B2 * | 12/2014 | Murase et al. | 345/156 |
| 8,902,193 B2 * | 12/2014 | Hansen et al. | 345/175 |
| 2003/0004678 A1 | 1/2003 | Zhang | |
| 2003/0218761 A1 | 11/2003 | Tomasi | |

* cited by examiner

Figure 10a                 Figure 10b

TOUCH SENSITIVE DISPLAY DEVICES

CROSS REFERENCE TO RELATED APPLICATION

This application claims priority to PCT Application No. PCT/GB2012/051384 entitled "Touch Sensitive Display Devices" and filed Jun. 15, 2012, which itself claims priority to Great Britain Patent Application No. GB1110156.5 filed Jun. 16, 2011, and to U.S. Patent Application 61/508,857 filed Jul. 18, 2011. The entirety of each of the aforementioned applications is incorporated herein by reference for all purposes.

FIELD OF THE INVENTION

This invention relates to touch sensing systems, to related methods and to corresponding processor control code. More particularly the invention relates to systems employing image projection techniques in combination with a touch sensing system which projects a plane of light adjacent the displayed image.

Aspects of the invention relate to implementation of multi-touch techniques in such systems.

BACKGROUND OF THE INVENTION

Background prior art relating to touch sensing systems employing a plane of light can be found in U.S. Pat. No. 6,281,878 (Montellese), and in various later patents of Lumio/VKB Inc, such as U.S. Pat. No. 7,305,368, as well as in similar patents held by Canesta Inc, for example U.S. Pat. No. 6,710,770. Broadly speaking these systems project a fan-shaped plane of infrared (IR) light just above a displayed image and use a camera to detect the light scattered from this plane by a finger or other object reaching through to approach or touch the displayed image.

Further background prior art can be found in: WO01/93006; U.S. Pat. Nos. 6,650,318; 7,305,368; 7,084,857; 7,268,692; 7,417,681; 7,242,388 (US2007/222760); US2007/019103; WO01/93006; WO01/93182; WO2008/038275; US2006/187199; U.S. Pat. Nos. 6,614,422; 6,710,770 (US2002/021287); U.S. Pat. Nos. 7,593,593; 7,599,561; 7,519,223; 7,394,459; 6,611,921; D595785; 6,690,357; 6,377,238; 5,767,842; WO2006/108443; WO2008/146098; U.S. Pat. No. 6,367,933 (WO00/21282); WO02/101443; U.S. Pat. Nos. 6,491,400; 7,379,619; US2004/0095315; U.S. Pat. Nos. 6,281,878; 6,031,519; GB2,343,023A; U.S. Pat. No. 4,384,201; DE 41 21 180A; and US2006/244720.

We have previously described techniques for improved touch sensitive holographic displays, in particular in our earlier patent applications: WO2010/073024; WO2010/073045; and WO2010/073047. The inventors have continued to develop and advance touch sensing techniques relating to these systems.

BRIEF SUMMARY OF THE INVENTION

According to a first aspect of the invention there is therefore provided a touch sensitive device, the device comprising: a touch sensor light source to project a plane of light above a surface; a camera directed to capture a touch sense image from a region including at least a portion of said plane of light, said touch sense image comprising light scattered from said plane of light by a plurality of said objects simultaneously approaching or touching said surface; a signal processor coupled to said camera, to process a said touch sense image from said camera to identify a lateral location of each of said objects; and an output object position output, to provide output object positions for said plurality of objects; and wherein said signal processor is further configured to: input a succession of said touch sense images; process each said touch sense image to identify a plurality of candidate object touch positions; and filter said candidate object touch positions from said successive touch sense images to link said candidate object touch positions to previously identified output object positions for said plurality of objects; and update said previously identified output object positions using said linked candidate object touch positions.

In embodiments the linking between previous and current object/finger positions, more particularly between candidate positions and previous output positions, may be performed by pairing the previous and current positions for example based upon brightness/intensity of the captured image of the object and/or adjacency of previous and current positions. Preferably a continuity rule is applied, for each object position in a previous set looking for the closest identified candidate position in the current set and where such a position can be identified, allocating the object the same identifier. Each detected object has an identifier which is continuous from one captured touch sensed image to the next until it is determined that an identified object is no longer present (for example based on intensity and/or adjacency). In embodiments the filtering process also identifies new object/finger positions, for example by identifying those positions which do not pair off with previously identified object positions. In embodiments there are more object identifiers than potential objects to be identified (although the identifiers will eventually roll around), although if, say, object one is determined to have vanished then the objects may be re-labelled so that object 2 becomes object 1. In embodiments the linking of previous and current object positions is performed according to a degree of probability that the positions are linked, for example using a maximum likelihood approach. Optionally more than one previous object position may be employed to help infer an object/finger position using a series of historical positions. The system may infer a predicted position (for object continuity). Additionally or alternatively the system may infer an actual position (for reporting), using the historical positions in addition to other data. This may be employed to infer an actual position of a finger or other object if it is in a shadowed area.

In embodiments a previous and current object position may be linked or paired by finding the nearest current candidate object position to a previously identified object position. This may be performed by, effectively, searching within a radius of a previous position. However, the region of search around a previous object position need not be circularly symmetric and may, for example, be elongated in a predicted direction of motion of the object. (The skilled person will appreciate that the use of the term 'search' does not necessarily imply a stepwise search but can encompass, for example, a determination of new-old overlap within a region). Where an anisotropic search region is employed, the length of the region may be dependent upon an inferred speed of motion of the object. In a variant of this approach adjacency in two perpendicular directions, a direction of travel and a direction perpendicular to the direction of travel may be employed, optionally weighted, to link a current candidate object position to a previously identified object position. In embodiments the filter may comprise a tracking filter such as a Kalman filter configured to predict one or both of position and velocity of an object, optionally coupled to a target allocator to allocate object identifiers responsive to position and/or estimates for the objects from the tracking or Kalman filter. In embodiments as described later, a priori data may be incorporated into the tracking filter prediction, for example to define a limit to an object's range of motion between successive touch sense images and/or to incorporate predicted occlusion of portions of a captured touch sense image.

In embodiments of the device, in particular where a relatively high resolution camera is employed, the identification of a candidate object position may be made by correlating the captured data with stored data defining a shape characteristic of one or more objects to be identified. Such a correlation may be performed in any convenient manner, for example by matching shapes and/or spatial filtering. Optionally multiple different types of object may be distinguished. In embodiments the correlation process may be made insensitive to small differences in rotation between the captured image of the object and the stored shape data, for example by correlating over a range of rotations or by storing shape data 'smeared' over a small range of rotations.

The projected plane of light produces a characteristic, generally half-moon shape in a captured touch sense image when a finger is interacting with the plane of light. Thus in some preferred embodiments the stored shape data defines such a generally half-moon shape, that is, broadly speaking, a shape characteristic of an intersection of a cylinder with the plane of light. (However, depending on its attitude with respect to the light a finger may alternatively create an oval, teardrop or arcuate shape in a captured touch sense image, and thus the stored shape data may additionally or alternatively define one of these shapes).

Optionally shape detection may even be employed to distinguish between different fingers of a user and/or other objects, and hence to assist in tracking individual fingers and/or other objects.

In embodiments an optical axis of the camera is directed at an acute angle towards the plane of light. Thus the captured touch sense images are keystone-distorted (and there may be other distortions associated with the image capture optics particularly if these are inexpensive). In embodiments a captured touch sense image may be corrected for this distortion. However optionally the stored shape date may represent a (keystone) distorted version of the object shape as seen by the touch sensing camera, that is distorted in substantially the same way as the captured touch sense image. This can reduce the processing required to detect an object.

In broad terms, in some embodiments a candidate object position may be identified by matching a size and/or shape of a portion of the captured image with that of a target object. In a touch sensing system employing a plane of light as previously described one problem that can arise is that the images of different objects/fingers can partially or wholly merge in a captured touch sense image. Detecting a candidate object position based on an object's size and/or shape can help to distinguish separate objects as these will generally have a different size/shape and/or multiple intensity peaks. In embodiments the identification of a candidate object position is responsive to size and/or shape and/or intensity distribution to distinguish merged images of different objects/fingers in a touch sense image.

A further advantage of object identification based on size and/or shape is that, in embodiments, there is improved resiliency to background or ambient light. Thus although ambient light compensation may be employed by capturing images with the projected plane of light on and off and differencing these to suppress ambient/background light, in embodiments of the above described techniques such ambient light compensation may be omitted.

In embodiments the object/finger position data is processed by a touch state machine or action decode module to convert object present/absent data into finger up/down data. However this may be combined into the filter module so that the filter data output comprises a set of object/finger identifiers and corresponding positions (absolute or relative, for example relative to the projected image). In embodiments this data may also include probability data for each output object position defining a level of uncertainty in the position or object presence/absence data.

In embodiments of the above described device the filter module may additionally be responsive to a second derivative of an object's position that is to acceleration data. This may be employed for improved tracking where objects merge and then re-separate in a capture image, for example when one goes behind another in the plane of light.

A particular problem with touch sensing using a plane of light is that an object near the source of illumination creates a shadow or occluded region which diverges away behind the object and this can interfere with object recognition. Thus embodiments of the system may include an occlusion detection module to predict locations in a touch sense image at which light from the touch sensor light source is occluded by an object between the locations and the light source. One or more of the candidate object position identification, the filtering, and the position updating may then be responsive to this occlusion detection. For example the removal of a shadow may generate a spurious candidate object identification, which may be suppressed by the occlusion detection system. Additionally or alternatively the linking of current candidate and previously identified object positions may be dependent on predicted occlusions of a captured touch sense image. Optionally an image interpolation module may also be included, coupled to an occlusion prediction system, to fill in by interpolation or, equivalently, extrapolation of, a predicted occluded portion of a touch sense image. This may be achieved by generating a portion of the touch sense image responsive to one or both of an output object position and a predicted occluded portion of the touch sense image.

The processing may also be configured to disregard a candidate object which is substantially motionless for greater than a threshold duration. This is particularly important in a system which differences captured touch sense images, for example to extract background ambient illumination. In such a system removal of a previously stationary object can generate spurious touch sense signals—for example removal of a coffee cup located in a shadowed region behind a user's finger. In embodiments an occlusion detection module may be configured to detect a substantially stationary object and to mark a region of a captured touch sense image as 'functionally' occluded in response to such detection. Such labelling of a region of a touch sense image is preferably performed at the image level, for example by employing a mask corresponding to a touch sense image having regions or mask portions identifying where the touch sensing system is ignorant or 'functionally ignorant' of a sensed touch. Such a mask may take into account the fan-like geometry of the plane of light used for touch sensing. Additionally the processing may include filtering out candidate objects by size and/or shape, for example to disregard objects of greater than a certain size.

The skilled person will appreciate that a touch sensitive image display device may comprise different combinations of the above described features. Thus in a related aspect the invention provides a touch sensitive device, the device comprising: a touch sensor light source to project a plane of light above said surface; a camera directed to capture a touch sense image from a region including at least a portion of said plane of light, said touch sense image comprising light scattered from said plane of light by a plurality of said objects simultaneously approaching or touching said surface: a signal processor coupled to said camera, to process a said touch sense image from said camera to identify a lateral location of each of said objects; and an output object position output, to provide output object positions for said plurality of objects; and wherein said signal processor is further configured to: input a succession of said touch sense images; and process each said touch sense image to identify a plurality of candidate object touch positions; and wherein said processing to identify a said candidate object position comprises correlating stored data shape characteristic of said object with data derived from said touch sense image.

In a further related aspect the invention provides a touch sensitive device, the device comprising: a touch sensor light source to project a plane of light above said surface: a camera directed to capture a touch sense image from a region including at least a portion of said plane of light, said touch sense image comprising light scattered from said plane of light by an object approaching or touching said surface; and a signal processor coupled to said camera, to process a said touch sense image from said camera to identify a lateral location of said object; wherein said signal processor is further configured to: input a succession of said touch sense images; process each said touch sense image to identify at least one candidate object touch position; filter said candidate object touch positions from said successive touch sense images to link said candidate object touch position to a previously identified output object position for a said object; and update said previously identified object position using said linked candidate object touch position.

The invention also provides a touch sensitive device, the device comprising: a touch sensor light source to project a plane of light above said surface; a camera directed to capture a touch sense image from a region including at least a portion of said plane of light, said touch sense image comprising light scattered from said plane of light by an object approaching or touching said surface; and a signal processor coupled to said camera, to process a said touch sense image from said camera to identify a lateral location of said object; wherein said signal processor is further configured to: input a succession of said touch sense images; and process each said touch sense image to identify at least one candidate object touch position; wherein said processing to identify a said candidate object position comprises correlating stored shape data characteristic of said object with data derived from a touch sense image; and output object location data determined responsive to said candidate object touch position. In some embodiments of the above described device a coarse grid is applied to the touch sense image. This may be in order to reduce memory requirements or in order to identify approximate locations of the objects/fingers, so that only these regions need be processed in detail. Additionally or alternatively some or all of the processing may take place on a distorted grid that matches the distortion of the projected/captured image resulting from the acute angle image projection/capture. More particularly in such an approach a candidate object touch position may be identified in this distorted grid to determine the object location data. In a further related aspect the invention provides a touch sensitive device, the device comprising: a touch sensor light source to project a plane of light above said surface; a camera directed to capture a touch sense image from a region including at least a portion of said plane of light, said touch sense image comprising light scattered from said plane of light by an object approaching or touching said surface; and a signal processor coupled to said camera, to process a said touch sense image from said camera to identify a lateral location of said object: wherein said signal processor is further configured to: input a succession of said touch sense images; process each said touch sense image to identify at least one candidate object touch position: and output object location data determined responsive to said candidate object touch position; wherein said signal processor is further configured to perform occlusion detection to predict one or more locations in a said touch sense image at which light from said touch sensor light source is occluded by an object between said location and said light source; wherein said occlusion detection is responsive to detection of a said candidate object position which is substantially unchanging for greater than a threshold duration; and wherein said output object location data is determined responsive to said occlusion detection.

The invention still further provides a touch sensitive device, the device comprising: a touch sensor light source to project a plane of light above said surface; a camera directed to capture a touch sense image from a region including at least a portion of said plane of light, said touch sense image comprising light scattered from said plane of light by an object approaching or touching said surface; and a signal processor coupled to said camera, to process a said touch sense image from said camera to identify a lateral location of said object; wherein said signal processor is further configured to: input a succession of said touch sense images; process each said touch sense image to identify at least one candidate object touch position; and output object location data determined responsive to said candidate object touch position; and wherein said signal processor is still further configured to process a said touch sense image by: thresholding said touch sense image to provide a thresholded image; identify a candidate object touch position in said thresholded image; and process said touch sense image in a region of said candidate object touch position to determine said output object location data.

In embodiments the effective brightness of a captured touch sense image varies with position within the image because of the acute angle ('table down') image capture technique and for other reasons (brightness also varies because of varying distance from illuminator to object and potentially because of features of the camera optics such as vignetting by a lens). Thus in embodiments the threshold applied to a touch sense image may vary with position in the image to compensate for variations in an amount of light captured from a scattering object at different locations within the image. In embodiments candidate object touch positions are located in camera image space and then (keystone) distortion correction is applied.

In preferred embodiments an anti-position-jitter filter is applied, for example a digital filter configured to provide a degree of position-hysteresis, to reduce touch position noise. Preferably the device includes a touch state machine to implement finger tracking and action (finger up/down) decoding.

In embodiments a touch sensitive device as described above may be an image display device, in particular comprising an image projector, such as a holographic image projector, to project a displayed image onto the surface in front of the device. The touch sensor light source is then configured to project the plane of light above the displayed image, and the signal processor is configured to process a touch sense image to identify a lateral location of the or each of said objects relative to the displayed image.

The invention also provides methods corresponding to the above described operational features of a touch sensitive image display device. Asymmetric Adaptive Tracking Filter In some preferred implementations of the above described techniques tracking filtering is applied to a (candidate) object touch position, for example employing Kalman filter, alpha-beta filter or another type of prediction filter. However with such a filter a problem can arise in tracking a sharp change in direction of an object/finger—the prediction tends to overshoot at a corner.

This can be addressed by weighting or in some other manner 'trusting' a component of a measured object position along an estimated direction of travel more than a component perpendicular to the direction of travel.

Thus in a further aspect the invention provides a touch sensing system, the system comprising: a touch sensor light source to project light above a surface; a camera having image capture optics configured to capture a touch sense image from a region including at least a portion of said projected light, said touch sense image comprising light scattered from said region by an object approaching said displayed image; and a signal processor coupled to said camera, to process a said touch sense image from said camera to identify a location of said object: wherein said signal processor is configured to implement an object position tracking system to provide said location of said object, said object position tracking system comprising: a system to predict an object position and direction of travel; a system to update said predicted object position responsive to a detected object position; and first and second position filters to, respectively, filter said object along and perpendicular to said direction of travel, such that greater filtering is applied perpendicular to said direction of travel than along said direction of travel.

The skilled person will appreciate that the signal processor may be implemented in software or in hardware (circuitry) or in a combination of the two. The output from the tracking system, an object location, is in embodiments an output from a tracking filter such as a Kalman filter, alpha-beta filter or the like. In embodiments a co-ordinate system in which an object position is defined is rotated so that its axes lie along and perpendicular to the direction of travel of the object (which may be a predicted or estimated direction of travel). Then reduced filtering is applied along the direction of travel as compared with filtering applied perpendicular to the direction of travel. As described in detail later, this results in well defined lines with sharp corners. Optionally the degree of filtering in either or both directions may be dependent on the speed of the object, in particular reducing with reducing speed. In embodiments, at zero speed substantially the same filtering is applied parallel and perpendicular to the direction of travel.

As the skilled person will appreciate, a prediction/tracking filter generally has one or more parameters which indicate how much trust to place in an internal state of the filter (a position/velocity estimate based on old data) as compared with new data. For example if there is low trust of new position data the object location (in embodiments an estimated position output from the filter) may be slow to react (and similarly with velocity). In embodiments the new position data is resolved into (change in) position data parallel and perpendicular to the predicted direction of motion of the object (the internal state of the filter). Then the component parallel to the direction of travel is trusted more than that perpendicular to the direction of travel, in effect assuming that the former has lower noise. These different levels of 'trust' are applied when updating the adaptive tracking filter. This can be achieved by filtering more heavily in a direction parallel to as compared with perpendicular to the direction of travel of the object. In this context a heavy filtering may, for example, employ a longer time constant or low pass filtering whereas lighter filtering may employ a shorter time constant and/or higher pass filtering. Thus in the embodiments the tracking filter comprises an adaptive, directionally-asymmetric filter.

An adaptive tracking filter such as a Kalman filter or alpha-beta filter scales down the position jitter but can still leave some residual position noise. In embodiments, therefore, a filter with position hysteresis is applied in the processing determining an object location, for example hysteresis is applied to the tracking filter output.

In one implementation the hysteresis filter detects when the object location moves from an initial location to a boundary displaced from the initial location and then replaces a new location of the object with a corresponding reverse displacement from the boundary. In embodiments this is implemented by conceptually drawing a loop, for example, a circle oval or rectangle, around the initial object location. There is no change in the output location providing position jitter remains within the loop boundary, but if the position moves up to and beyond the boundary, the loop is dragged with the object location and when a new position is reported, the centre of the loop (circle, oval, rectangle or the like) is reported. This removes rather than merely scaling down jitter. Furthermore an approach of this type operates synergistically with an adaptive tracking filter since a tracking filter tends to overshoot at a corner, whereas the loop—dragging hysteresis filter tends to define a path around the inside of a corner because of the finite size of the loop and, conceptually, these two different effects tend to balance one another. Furthermore this type of hysteresis filter keeps up with a user during fast motion, thus helping to provide an intuitive interface. In a related aspect, therefore, the invention provides a touch sensing system, the system comprising: a touch sensor light source to project light above a surface; a camera having image capture optics configured to capture a touch sense image from a region including at least a portion of said projected light, said touch sense image comprising light scattered from said region by an object approaching said displayed image; and a signal processor coupled to said camera, to process a said touch sense image from said camera to identify a location of said object; wherein said signal processor is configured to implement a hysteresis filter to filter said location of said object with position hysteresis. The invention further provides a touch sensitive image display device incorporating a touch sensing system as described above.

In a related aspect the invention provides a method of implementing a touch sensing system, the system comprising: projecting light above a surface: capturing a touch sense image from a region including at least a portion of said light using a camera, said touch sense image comprising light scattered from said projected light by an object approaching said displayed image; and tracking said object by: predicting a position of said object from two or more previous predicted positions of the object; determining a predicted direction of travel of said object; and determining an updated predicted position of said object from updated object position data from said camera; wherein said determining of said updated predicted position filters a component of said object position data perpendicular to said direction of travel more than a component of said object position data along said direction of travel. The invention further provides processor control code configured to implement the above described signal processing. The code is provided on a physical carrier such as a disk, CD- or DVD-ROM, programmed memory or other physical computer-readable medium. Code and/or data to implement embodiments of the invention may comprise source, object or executable code in one or more conventional programming languages (interpreted or compiled), or the code may comprise code for setting up or controlling an ASIC (Application Specific Integrated Circuit) or FPGA (Field Programmable Gate Array) or code for a hardware description language such as Verilog, VHDL, or SystemC. As the skilled person will appreciate such code and/or data may be distributed between a plurality of coupled components in communication with one another.

The skilled person will appreciate that, in general, the signal processing we describe herein may be implemented in software, or in hardware (circuitry), or in a combination of the two.

Embodiments of each of the above described aspects of the invention are not limited to use with any particular type of projection technology. Thus although we will describe later an example of a holographic image projector, the techniques of the invention may also be applied to other forms of projection technology including, but not limited to, digital micromirror-based projectors such as projectors based on DLP™ (Digital Light Processing) technology from Texas Instruments, Inc.

BRIEF DESCRIPTION OF THE DRAWINGS

These and other aspects of the invention will now be further described, by way of example only, with reference to the accompanying figures in which:

FIGS. 10a to 10c show, respectively, an illustration of operation of a loop hysteresis filter according to an embodiment of the invention with a static touch object, an illustration of operation of a loop hysteresis filter according to an embodiment of the invention with a moving touch object; and a flow diagram of a procedure to implement a loop hysteresis filter according to an embodiment of the invention.

DETAILED DESCRIPTION OF PREFERRED EMBODIMENTS

Figure 1A:
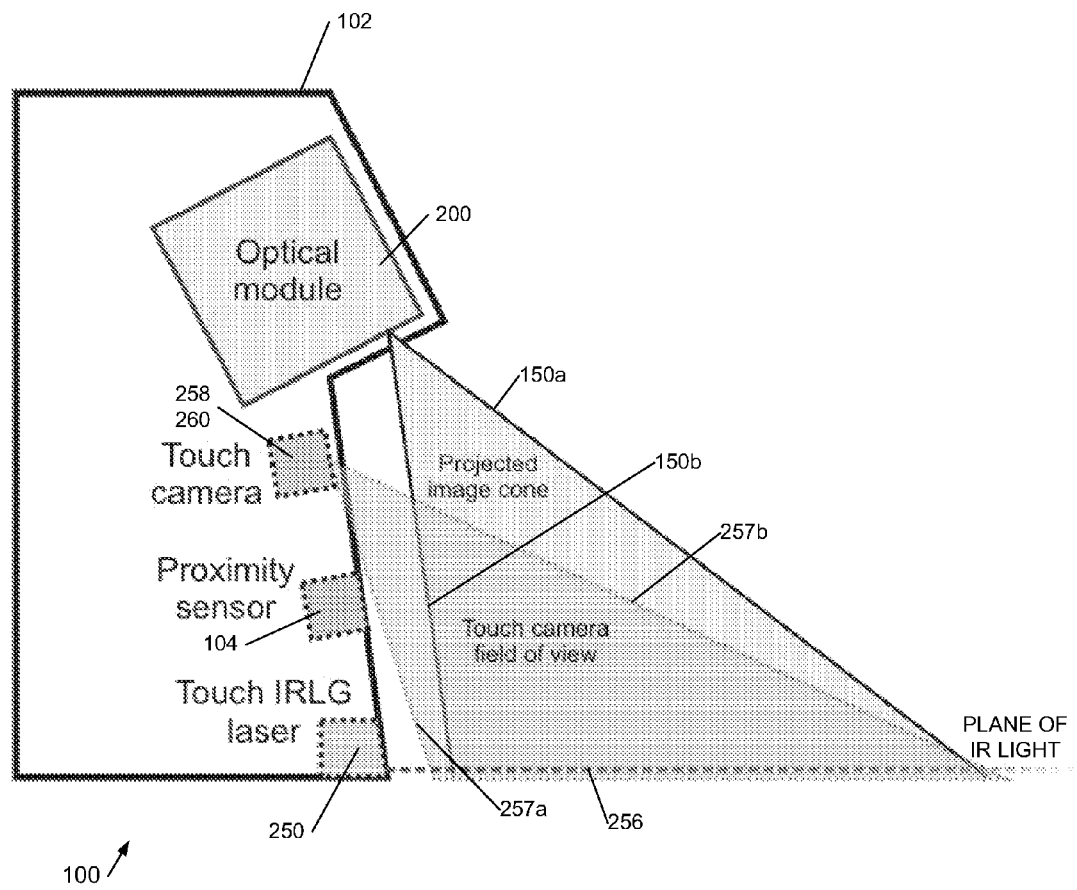
FIGS. 1a and 1b show, respectively, a vertical cross section view through an example touch sensitive image display device suitable for implementing embodiments of the invention, and details of a plane of light-based touch sensing system for the device.
Figure 1B:
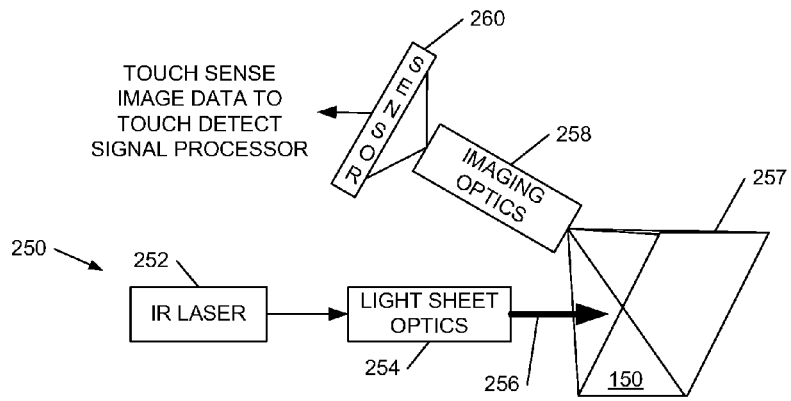

FIGS. 1a and 1b show an example touch sensitive holographic image projection device 100 comprising a holographic image projection module 200 and a touch sensing system 250, 258, 260 in a housing 102. A proximity sensor 104 may be employed to selectively power-up the device on detection of proximity of a user to the device.

A holographic image projector is merely described by way of example; the techniques we describe herein may be employed with any type of image projection system.

The holographic image projection module 200 is configured to project downwards and outwards onto a flat surface such as a tabletop. This entails projecting at an acute angle onto the display surface (the angle between a line joining the center of the output of the projection optics and the middle of the displayed image and a line in a plane of the displayed image is less than 90°). We sometimes refer to projection onto a horizontal surface, conveniently but not essentially non-orthogonally, as "table down projection". A holographic image projector is particularly suited to this application because it can provide a wide throw angle, long depth of field, and substantial distortion correction without significant loss of brightness/efficiency. Boundaries of the light forming the displayed image 150 are indicated by lines 150a, b.

The touch sensing system 250, 258, 260 comprises an infrared laser illumination system (IR line generator) 250 configured to project a sheet of infrared light 256 just above, for example ~1 mm above, the surface of the displayed image 150 (although in principle the displayed image could be distant from the touch sensing surface). The laser illumination system 250 may comprise an IR LED or laser 252, preferably collimated, then expanded in one direction by light sheet optics 254, which may comprise a negative or cylindrical lens. Optionally light sheet optics 254 may include a 45 degree mirror adjacent the base of the housing 102 to fold the optical path to facilitate locating the plane of light just above the displayed image.

A CMOS imaging sensor (touch camera) 260 is provided with an ir-pass lens 258 captures light scattered by touching the displayed image 150, with an object such as a finger, through the sheet of infrared light 256. The boundaries of the CMOS imaging sensor field of view are indicated by lines 257, 257a,b. The touch camera 260 provides an output to touch detect signal processing circuitry as described further later.

Example Holographic Image Projection System

Figure 2B:
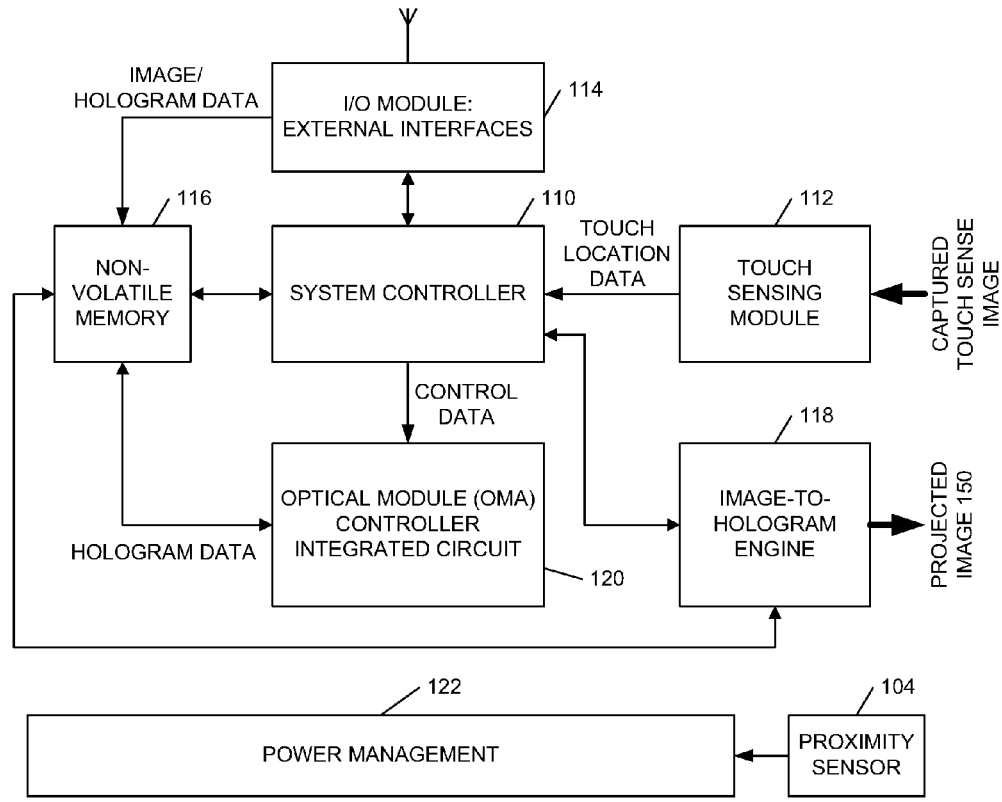
FIGS. 2a and 2b show, respectively, a holographic image projection system for use with the device of FIG. 1, and a functional block diagram of the device of FIG. 1.
Figure 2A:
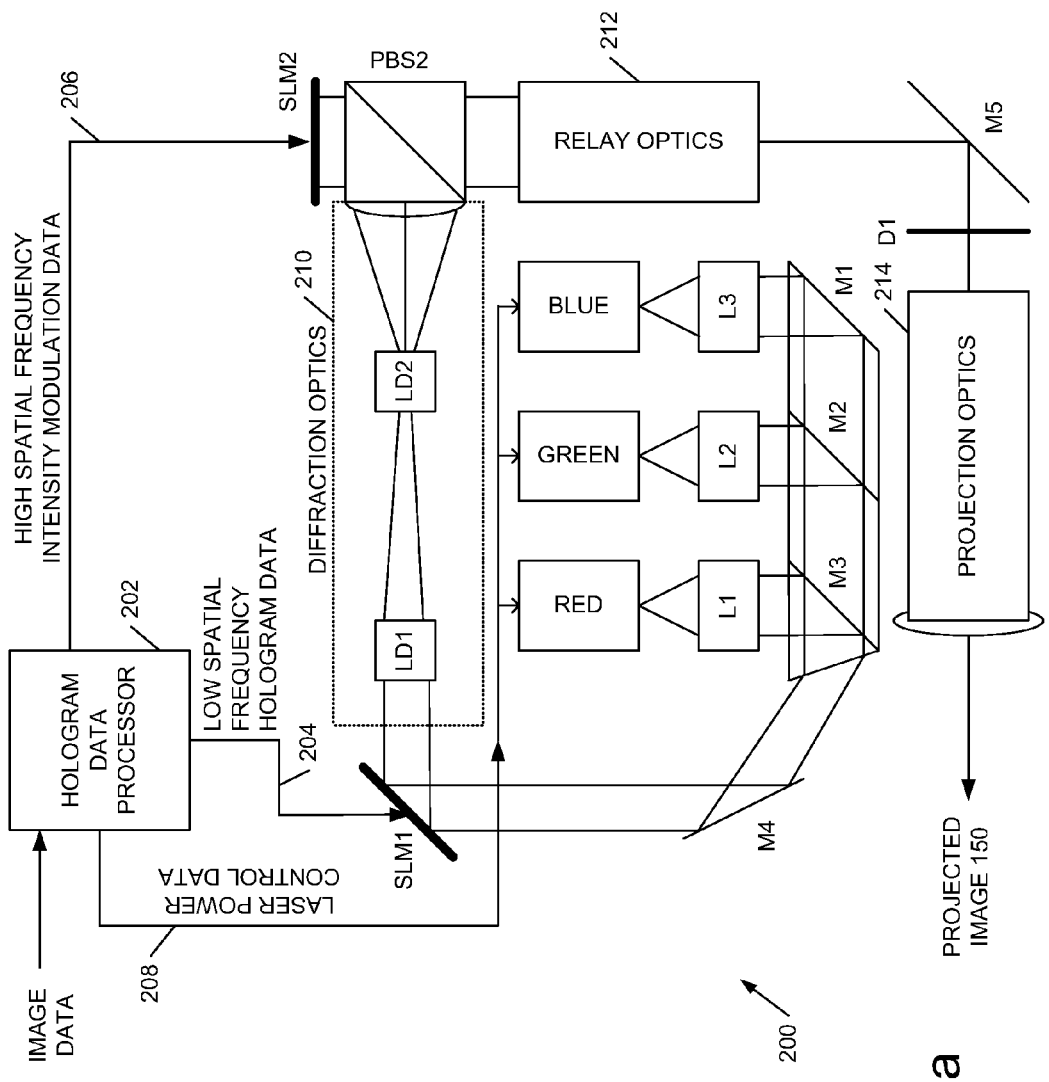

FIG. 2a shows an example holographic image projection system architecture 200 in which the SLM may advantageously be employed. The architecture of FIG. 2 uses dual SLM modulation—low resolution phase modulation and higher resolution amplitude (intensity) modulation. This can provide substantial improvements in image quality, power consumption and physical size. The primary gain of holographic projection over imaging is one of energy efficiency. Thus the low spatial frequencies of an image can be rendered holographically to maintain efficiency and the high-frequency components can be rendered with an intensity-modulating imaging panel, placed in a plane conjugate to the hologram SLM. Effectively, diffracted light from the hologram SLM device (SLM1) is used to illuminate the imaging SLM device (SLM2). Because the high-frequency components contain relatively little energy, the light blocked by the imaging SLM does not significantly decrease the efficiency of the system, unlike in a conventional imaging system. The hologram SLM is preferably be a fast multi-phase device, for example a pixellated MEMS-based piston actuator device.
In FIG. 2a:

SLM1 is a pixellated MEMS-based piston actuator SLM as described above, to display a hologram—for example a 160×160 pixel device with physically small lateral dimensions, e.g. <5 mm or <1 mm.

L1, L2 and L3 are collimation lenses (optional, depending upon the laser output) for respective Red, Green and Blue lasers.

M1, M2 and M3 are dichroic mirrors a implemented as prism assembly.

M4 is a turning beam mirror.

SLM2 is an imaging SLM and has a resolution at least equal to the target image resolution (e.g. 854×480); it may comprise a LCOS (liquid crystal on silicon) or DMD (Digital Micromirror Device) panel.

Diffraction optics 210 comprises lenses LD1 and LD2, forms an intermediate image plane on the surface of SLM2, and has effective focal length f such that $f\lambda/\Delta$ covers the active area of imaging SLM2. Thus optics 210 perform a spatial Fourier transform to form a far field illumination pattern in the Fourier plane, which illuminates SLM2.

PBS2 (Polarizing Beam Splitter 2) transmits incident light to SLM2, and reflects emergent light into the relay optics 212 (liquid crystal SLM2 rotates the polarization by 90 degrees). PBS2 preferably has a clear aperture at least as large as the active area of SLM2.

Relay optics 212 relay light to the diffuser D1.

M5 is a beam turning mirror.

D1 is a diffuser to reduce speckle.

Projection optics 214 project the object formed on D1 by the relay optics 212, and preferably provide a large throw angle, for example >90°, for angled projection down onto a table top (the design is simplified by the relatively low entendue from the diffuser).

The different colors are time-multiplexed and the sizes of the replayed images are scaled to match one another, for example by padding a target image for display with zeros (the field size of the displayed image depends upon the pixel size of the SLM not on the number of pixels in the hologram).

A system controller and hologram data processor 202, implemented in software and/or dedicated hardware, inputs image data and provides low spatial frequency hologram data 204 to SLM1 and higher spatial frequency intensity modulation data 206 to SLM2. The controller also provides laser light intensity control data 208 to each of the three lasers. For details of an example hologram calculation procedure reference may be made to WO2010/007404 (hereby incorporated by reference).

Control System

Referring now to FIG. 2b, this shows a block diagram of the device 100 of FIG. 1. A system controller 110 is coupled to a touch sensing module 112 from which it receives data defining one or more touched locations on the display area, either in rectangular or in distorted coordinates (in the latter case the system controller may perform keystone distortion compensation). The touch sensing module 112 in embodiments comprises a CMOS sensor driver and touch-detect processing circuitry.

The system controller 110 is also coupled to an input/output module 14 which provides a plurality of external interfaces, in particular for buttons, LEDs, optionally a USB and/or Bluetooth® interface, and a bi-directional wireless communication interface, for example using WiFi®. In embodiments the wireless interface may be employed to download data for display either in the form of images or in the form of hologram data. In an ordering/payment system this data may include price data for price updates, and the interface may provide a backhaul link for placing orders, handshaking to enable payment and the like. Non-volatile memory 116, for example Flash RAM is provided to store data for display, including hologram data, as well as distortion compensation data, and touch sensing control data (identifying regions and associated actions/links). Non-volatile memory 116 is coupled to the system controller and to the I/O module 114, as well as to an optional image-to-hologram engine 118 as previously described (also coupled to system controller 110), and to an optical module controller 120 for controlling the optics shown in FIG. 2a. (The image-to-hologram engine is optional as the device may receive hologram data for display from an external source). In embodiments the optical module controller 120 receives hologram data for display and drives the hologram display SLM, as well as controlling the laser output powers in order to compensate for brightness variations caused by varying coverage of the display area by the displayed image (for more details see, for example, our WO2008/075096). In embodiments the laser power(s) is (are) controlled dependent on the "coverage" of the image, with coverage defined as the sum of: the image pixel values, preferably raised to a power of gamma (where gamma is typically 2.2). The laser power is inversely dependent on (but not necessarily inversely proportional to) the coverage; in preferred embodiments a lookup table as employed to apply a programmable transfer function between coverage and laser power. The hologram data stored in the non-volatile memory, optionally received by interface 114, therefore in embodiments comprises data defining a power level for one or each of the lasers together with each hologram to be displayed; the hologram data may define a plurality of temporal holographic sub frames for a displayed image. Preferred embodiments of the device also include a power management system 122 to control battery charging, monitor power consumption, invoke a sleep mode and the like.

In operation the system controller controls loading of the image/hologram data into the non-volatile memory, where necessary conversion of image data to hologram data, and loading of the hologram data into the optical module and control of the laser intensities. The system controller also performs distortion compensation and controls which image to display when and how the device responds to different "key" presses and includes software to keep track of a state of the device. The controller is also configured to transition between states (images) on detection of touch events with coordinates in the correct range, a detected touch triggering an event such as a display of another image and hence a transition to another state. The system controller 110 also, in embodiments, manages price updates of displayed menu items, and optionally payment, and the like.

Touch Sensing Systems

Figure 3:
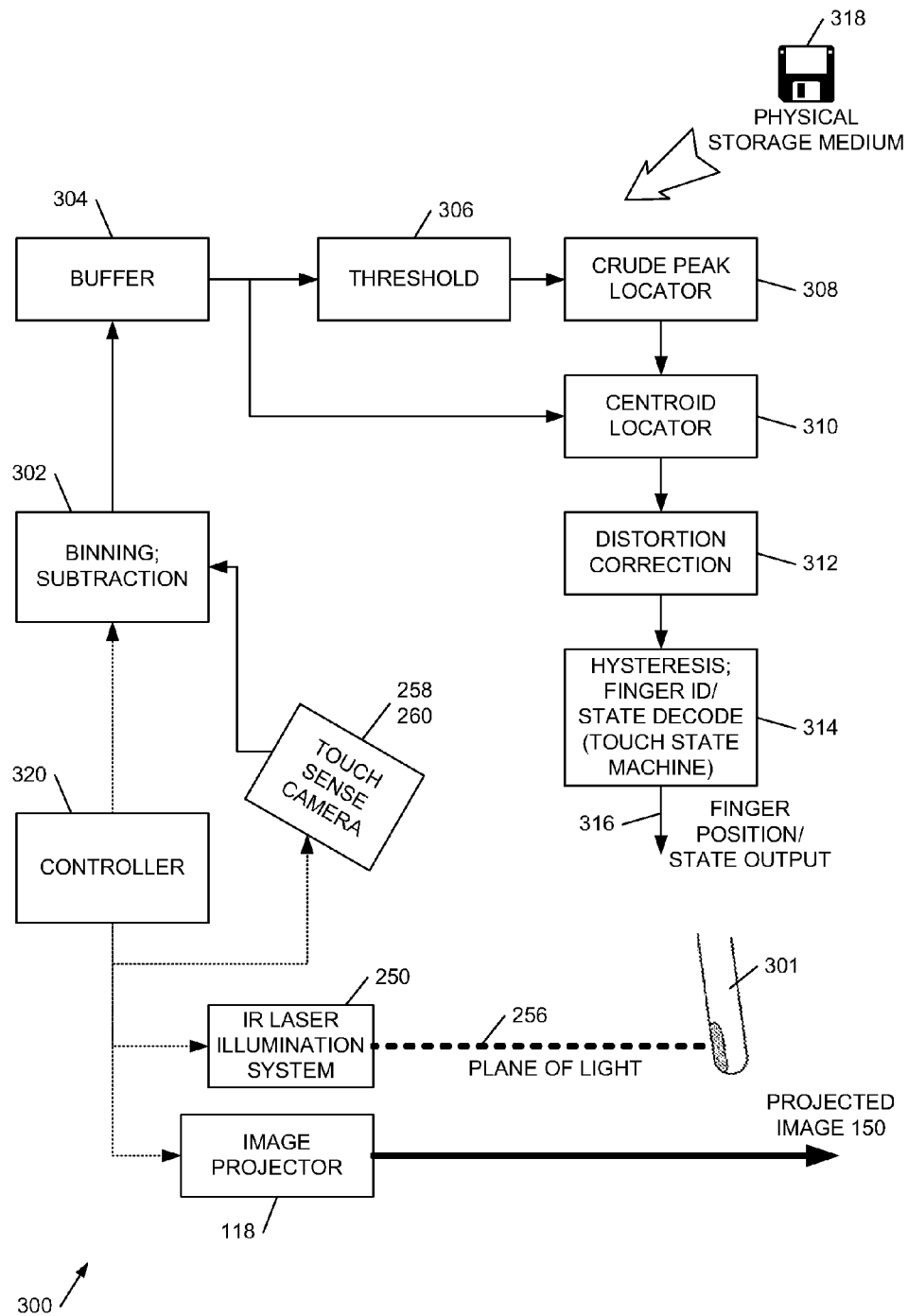
FIG. 3 shows an embodiment of a touch sensitive image display device according to an aspect of the invention.

Referring now to FIG. 3, this shows an embodiment of a touch sensitive image display device 300 according to an aspect of the invention. The system comprises an infrared laser and optics 250 to generate a plane of light 256 viewed by a touch sense camera 258, 260 as previously described, the camera capturing the scattered light from one or more fingers 301 or other objects interacting with the plane of light. The system also includes an image projector 118, for example a holographic image projector, also as previously described.

In the arrangement of FIG. 3 a controller 320 controls the IR laser on and off, controls the acquisition of images by camera 260 and controls projector 118. In the illustrated example images are captured with the IR laser on and off in alternate frames and touch detection is then performed on the difference of these frames to subtract out any ambient infrared. The image capture objects 258 preferably also include a notch filter at the laser wavelength which may be around 780-800 nm. Because of laser diodes process variations and change of wavelength with temperature this notch may be relatively wide, for example of order 20 nm and thus it is desirable to suppress ambient IR. In the embodiment of FIG. 3 subtraction is performed by module 302 which, in embodiments, is implemented in hardware (an FPGA).

In embodiments module 302 also performs binning of the camera pixels, for example down to approximately 80 by 50 pixels. This helps reduce the subsequent processing power/memory requirements and is described in more detail later. However such binning is optional, depending upon the processing power available, and even where processing power/memory is limited there are other options, as described further later. Following the binning and subtraction the captured image data is loaded into a buffer 304 for subsequent processing to identify the position of a finger or, in a multi-touch system, fingers.

Because the camera 260 is directed down towards the plane of light at an angle it can be desirable to provide a greater exposure time for portions of the captured image further from the device than for those nearer the device. This can be achieved, for example, with a rolling shutter device, under control of controller 320 setting appropriate camera registers.

Depending upon the processing of the captured touch sense images and/or the brightness of the laser illumination system, differencing alternate frames may not be necessary (for example, where 'finger shape' is detected). However where subtraction takes place the camera should have a gamma of substantial unity so that subtraction is performed with a linear signal.

Various different techniques for locating candidate finger/object touch positions will be described. In the illustrated example, however, an approach is employed which detects intensity peaks in the image and then employs a centroid finder to locate candidate finger positions. In embodiments this is performed in software. Processor control code and/or data to implement the aforementioned FPGA and/or software modules shown in FIG. 3 may be provided on a disk 318 or another physical storage medium.

Thus in embodiments module 306 performs thresholding on a captured image and, in embodiments, this is also employed for image clipping or cropping to define a touch sensitive region. Optionally some image scaling may also be performed in this module. Then a crude peak locator 308 is applied to the thresholded image to identify, approximately, regions in which a finger/object is potentially present (see FIG. 4b, later).

A centroid locator 310 (center of mass algorithm) is applied to the original (unthresholded) image in buffer 304 at each located peak, to determine a respective candidate finger/object location. The system then applies distortion correction 312 to compensate for keystone distortion of the captured touch sense image and also, optionally, any distortion such as barrel distortion, from the lens of imaging optics 258. In one embodiment the optical access of camera 260 is directed downwards at an angle of approximately 70° to the plane of the image and thus the keystone distortion is relatively small, but still significant enough for distortion correction to be desirable.

Because nearer parts of a captured touch sense image may be brighter than further parts, the thresholding may be position sensitive (at a higher level for mirror image parts) alternatively position-sensitive scaling may be applied to the image in buffer 304 and a substantially uniform threshold may be applied.

In one embodiment of the crude peak locator 308 the procedure finds a connected region of the captured image by identifying the brightest block within a region (or a block with greater than a threshold brightness), and then locates the next brightest block, and so forth, preferably up to a distance limit (to avoid accidentally performing a flood fill). Centroid location is then performed on a connected region. In embodiments the pixel brightness/intensity values are not squared before the centroid location, to reduce the sensitivity of this technique to noise, interference and the like (which can cause movement of a detected centroid location by more than once pixel).

In a multi-touch system a region may have more than one centroid and thus more than one candidate finger/object position may be located within each connected region. In a multi-touch system embodiments may determine an initial estimate of the number of fingers touching the image by determining an approximate overall amount of bright area within a captured image; preferably this performed on a captured image prior to the crude peak location, for example on the image stored in buffer 304. In embodiments this may be achieved by thresholding the image in buffer 304, although in general the threshold employed for 'finger present' detection will be different to that employed prior to the crude peak location step.

In embodiments the distortion correction module 312 performs a distortion correction using a polynomial to map between the touch sense camera space and the displayed image space. An example is given later and further background can be found in our published PCT application WO2010/073024.

Once a set of candidate finger positions has been identified, these are passed to a module 314 which tracks finger/object positions and decodes actions, in particular to identity finger up/down or present/absent events. In embodiments this module also provides some position hysteresis, for example implemented using a digital filter, to reduce position jitter. In a single touch system module 314 need only decode a finger up/finger down state, but in a multi-touch system this module also allocates identifiers to the fingers/objects in the captured images and tracks the identified fingers/objects.

In a multi-touch system the processing prior to the finger decode module 314 determines multiple sets of coordinates for respective candidate finger positions resulting from simultaneous touch events. Module 314 then attempts to link each candidate position with a previously identified finger/object, for example by attempting to pair each candidate position with a previously identified position in embodiments based on a measure of probability which may include (but is not limited to) distance between the previous and current positions, brightness of the scattered light and, optionally, size/shape of the image of the scattered light from the object/finger. Optionally when linking a present position to previous position the radius of the search may be dependent on a previously estimated speed of motion of the finger/object and/or the search may be dependent on an estimate of a direction of motion of the finger/object, for example by employing a search region which is an isotropic and elongated in a direction of travel of the finger/object. Where a pairing cannot be made then a finger up/down event may be generated depending on whether, respectively, a previously identified finger has 'vanished' or on whether a new finger/object position has 'appeared'.

In an example algorithm, when a first touch object/finger is detected this first object is assigned an identifier of 'Finger', and then when the number of detected simultaneous touches increases or decreases the procedure steps through the new, candidate position coordinate list (in any order) assigning each coordinate with an identifier corresponding to the respective identifier of the closest coordinate in the old (previous) list, up to a maximum radius limit. For a candidate object position beyond this radius limit of any previously identified position, a new identifier is assigned.

This procedure may be extended to distinguish between objects based upon their size and/or shape, for example to distinguish between a finger and thumb or between a finger and an object such as a pointer or even between different individual fingers. The system may also be configured to differentiate between large and small pointers or other objects so that, for example, in a drawing application a large object may act as an eraser and a smaller object may act as a brush.

An example set of touch position output data 316 may comprise two-dimensional position coordinates for each identified finger and/or other objects, as indicated in the table below:

| Frame | Finger 1 | Finger 2 | Finger 3 | Finger 4 | Finger 5 | Finger 6 | Object A |
|---|---|---|---|---|---|---|---|
| i − 2 | | | | | | | |
| i − 1 | $x_1^{i-1}$ | $x_2^{i-1}$ | $x_3^{i-1}$ | $x_4^{i-1}$ | $x_5^{i-1}$ | $x_6^{i-1}$ | $x_A^{i-1}$ |
| i | $x_1^i$ | $x_2^i$ | $x_3^i$ | $x_4^i$ | $x_5^i$ | $x_6^i$ | $x_A^i$ |
| i + 1 | | | | | | | |

In this example the six 'fingers' include a thumb, but in principle there may be more identified finger positions than five or six. Optionally one finger, for example Finger 1 may be designated as a 'mouse', in which case if Finger 1 vanishes the next brightest finger may be allocated as the mouse. It will be appreciated from the table that from the history of finger position data finger direction and/or speed may be estimated.

Embodiments of the touch sensitive image display device also include calibration software (not shown in FIG. 3) to calibrate the distortion correction and thresholding stages. For example the image projector 1 18 may be controlled to display a pattern of fiducial marks so that the user can point to each in turn, to correct for aberrations in the device optics, for example barrel distortion. Such points may be more closely spaced towards the edge of the displayed image, where the distortion is generally greater. This calibrates for distortions in both the touch sense camera system and the image projector. Such a calibration need only be performed once, for example at manufacture.

In general the field of view of the touch sense camera system is larger than the displayed image. As previously mentioned, to improve robustness of the touch sensing system touch events outside the displayed image area (which may be determined by calibration) may be rejected. This can be conveniently achieved by zero/'infinite' entries in the threshold table of threshold module 306 to clip the crude peak locator outside the image area (although this may still be 'overruled' by the centroid locator 301 because the brightest binned pixel is not necessarily the exact centre of mass). This helps reduce the sensitivity of the system to the presence of objects on the table near the touch area and/or the presence of other similar touch sense image display devices nearby.

Conversely the touch sensitive area may be clipped to define a border around part or all of the displayed image, to allow interaction with the content without touching the content display area. Such a border may be employed, for example, for gesture recognition such as a directional swipe to turn pages of a displayed image.

Finger Position Identification

We will now describe some example alternative approaches for determining approximating finger placement locations. The approaches are as follows:

1. Fixed-grid interpolation. A fixed-grid is applied to the camera image and a center-of-mass (CoM) algorithm is used to determine the likely position of the users' fingers.

2. Zoomed-grid interpolation. A coarse grid is applied to the camera image in order to estimate the approximate location of the users' fingers, and only the individual regions of interest are considered in greater detail.

3. Distorted-grid interpolation. A distorted grid that matches the distortion relating the table down image ('projection space') to the camera image is used in combination with a CoM algorithm to determine the users' finger position.

These may be combined but for simplicity we will describe them separately. We assume the touch sensor camera frame-rate is and has latency.

$'L_c$.

Approach 1—Fixed-grid Interpolation

The camera image is decimated in to a grid and based on the values accumulated in this grid, a CoM ("center of mass" or centroid) algorithm may be employed to determine finger-position locations. This may be used in conjunction with a differential (i.e. one frame laser on, next laser off) approach to minimize noise. This coordinate is then transformed into projected (image) space.

Figure 4A:
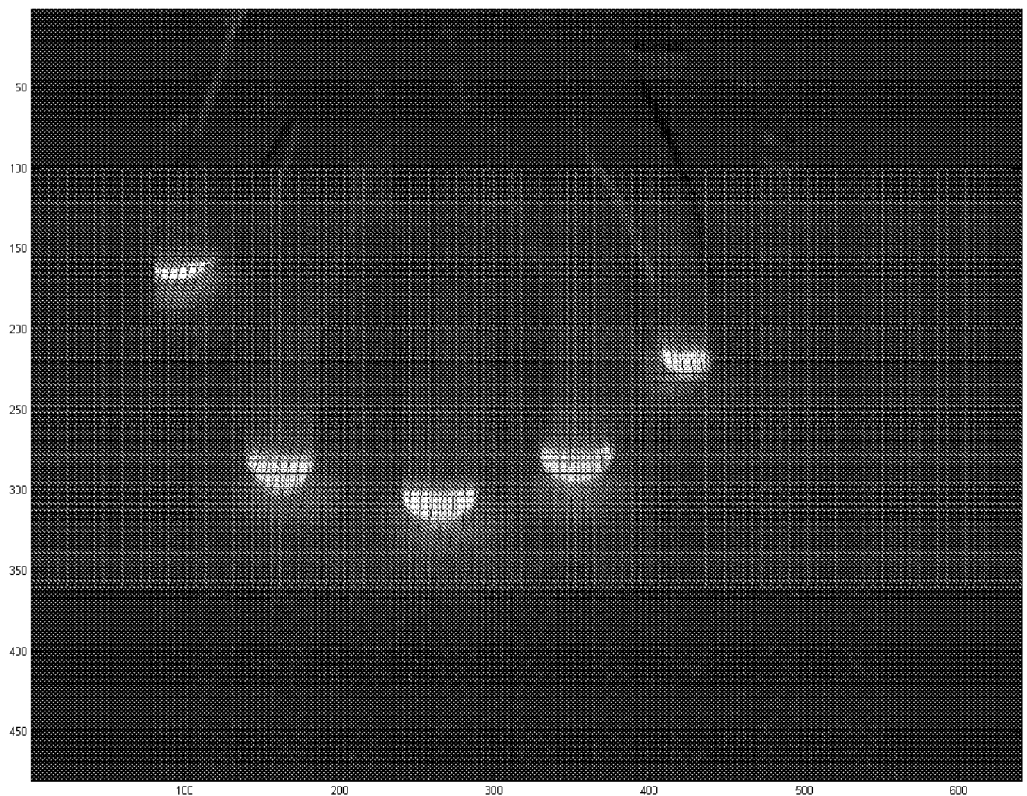
FIGS. 4a to 4d show, respectively, use of a fixed grid to find a finger centroid; use of a crude peak locator to find a finger centroid, and the resulting locations, use of a distorted grid to locate a finger centroid, and curves illustrating positional variance against grid decimation with varying spot (illuminated finger) size.

FIG. 4a illustrates us of this fixed grid approach to find the center-of-mass of a finger. The blue grid marks the approximate position of the 854×480 WVGA projected image (in blocks of 10×10 pixels), and the red grid shows the overlaid fixed grid in camera space. We are assuming a camera image size of 640×480, and an approximate camera angle of 35 degrees to the normal (i.e. 55 degrees to the table).

With this approach mapping from camera-space to projected space ideally employs a finer grid at locations further from the camera; hence the 'fine-ness' of the grid is fixed by the resolution of the finger placement at the furthest edges of the area in question. This results in increased memory usage, unless the fixed grid is adjusted such that there is finer resolution where desired.

It should be noted that the centroid calculation using a center-of-mass algorithm in camera space is not equivalent to a centroid calculation in projector space—although it may be used to approximate it.

We notice that for the thumb (the most problematic of the fingers since it is the furthest away), it has the smallest 'spot size' in the 'y'-direction; and from the results on center of mass accuracy given later we calculate that in theory, we can achieve a user-perceived resolution of approximately 4×4 (worst case on the projected image)—In other words, as the finger is being moved around it can be determined down to an accuracy of 4×4 pixels in the projected image, which is sufficient for many applications. An example implementation is as follows:

| | |
|---|---|
| Decimated grid: | 107 × 60 |
| Resolution: | ~4 × 4 pixels |
| Latency: | $2/F_C + L_C$ |
| Frame-rate: | $F_C/2$ |

Example Center-of-mass Calculation

A simple center-of-mass calculation is sufficient for the purpose of finding a centroid a given ROI (region of interest), and R(x,y) may be estimated thus:

$$x = \frac{\sum_{y_S=0}^{Y-1}\sum_{x_S=0}^{X-1} x_S R^n(x_S, y_S)}{\sum_{y_S=0}^{Y-1}\sum_{x_S=0}^{X-1} R^n(x_S, y_S)}$$

$$y = \frac{\sum_{y_S=0}^{Y-1}\sum_{x_S=0}^{X-1} y_S R^n(x_S, y_S)}{\sum_{y_S=0}^{Y-1}\sum_{x_S=0}^{X-1} R^n(x_S, y_S)}$$

where n is the order of the CoM calculation, and X and Y are the sizes of the ROI.

Approach 2—Zoomed-grid Interpolation

This approach is similar to approach 1, except that the decimation grid is much coarser (requiring less processing power and memory). A differential method is used to estimate where the finger press is, by taking the N maximum values of the grid, and then 'zooming in' around the finger to reveal the detail in order to find the exact spot location using a CoM method. This coordinate is then transformed in to projected space.

Figure 4B:
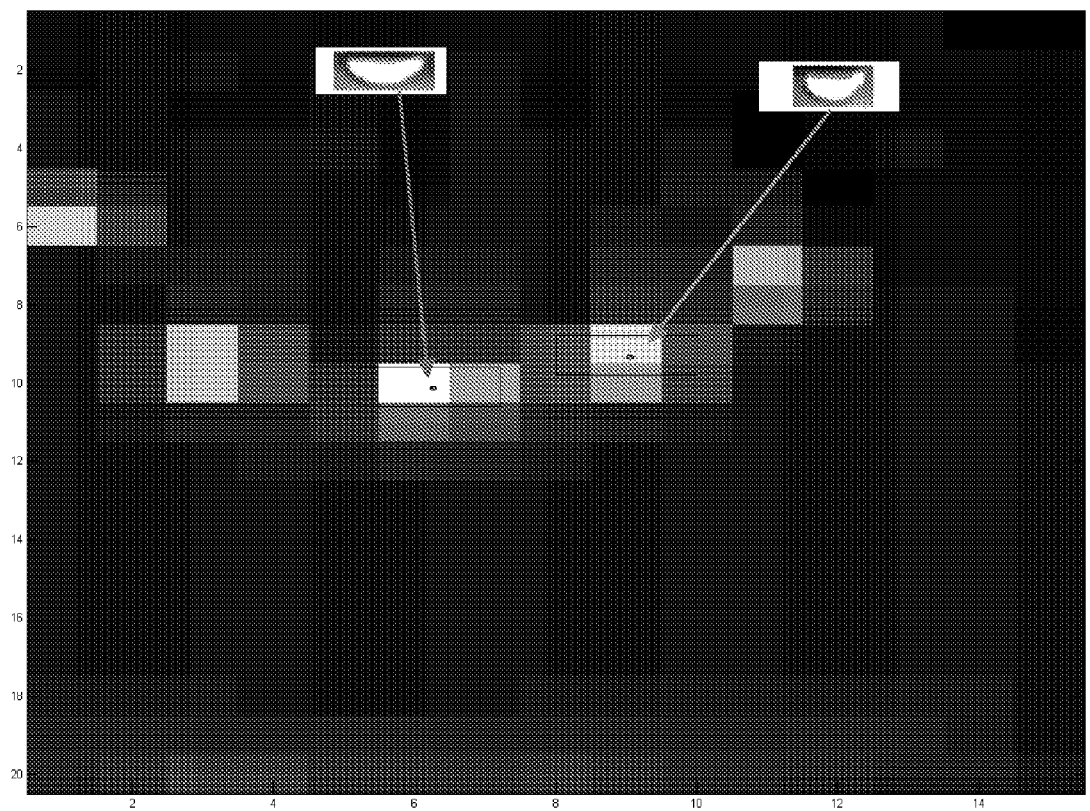
Figure 4C:
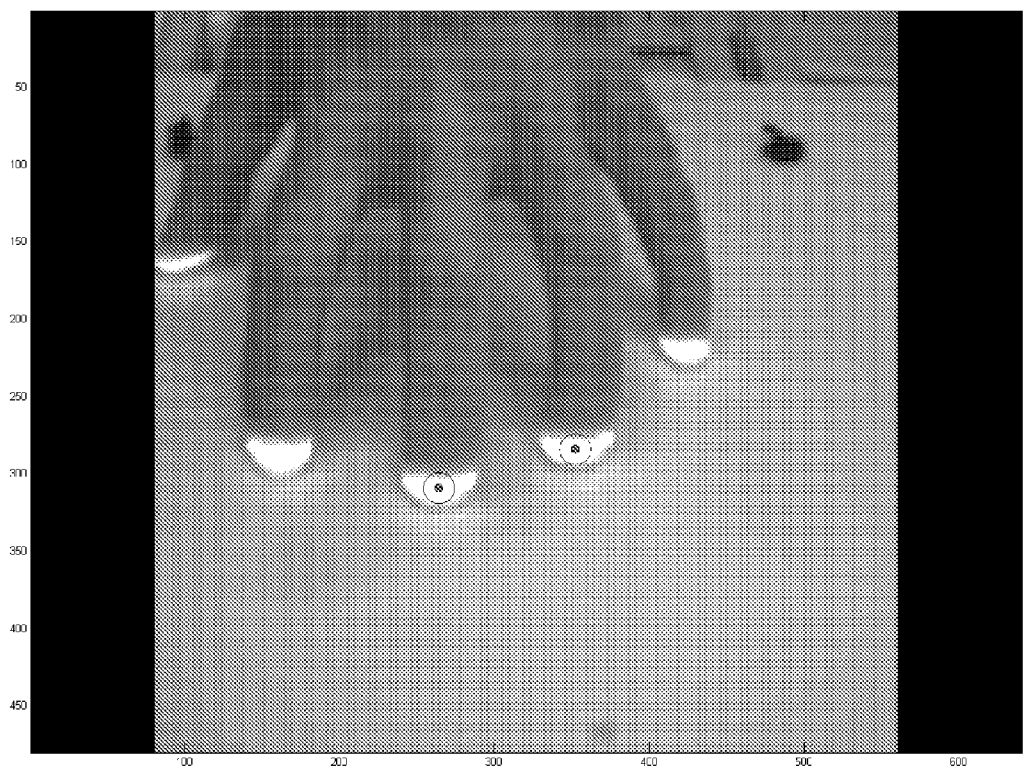

FIG. 4b illustrates an example coarse (decimated) grid approach. In the Figure the spots indicate the first estimation of the center-of-mass. We then take a 32×20 (say) grid around each of these (again preferably using differential frames for noise immunity) and perform center of mass algorithm on the individual regions of interest. Since this processing uses 4 frames (2 differential pairs), in order to maintain the frame rate to an acceptable level, we pipeline the process such that the fine and the coarse computations are performed simultaneously. This, however, results in double the latency compared to approach 1. FIG. 4c shows the results of the fine-grid position estimation, the spots indicating the finger locations found. An example implementation is as follows:

| | |
|---|---|
| Decimated grid: | 20 × 15 and 32 × 16 ×2 |
| Resolution: | <1 × 1 pixel |
| Latency: | $4/F_C + L_C$ |
| Frame-rate: | $F_C/2$ |

When using a coarse grid either two (pairs of) frames may be captured, processing the first coarsely and the second finely but locally; or both sets of processing may be applied to the same image.

Approach 3—Distorted-grid Interpolation

Figure 4D:
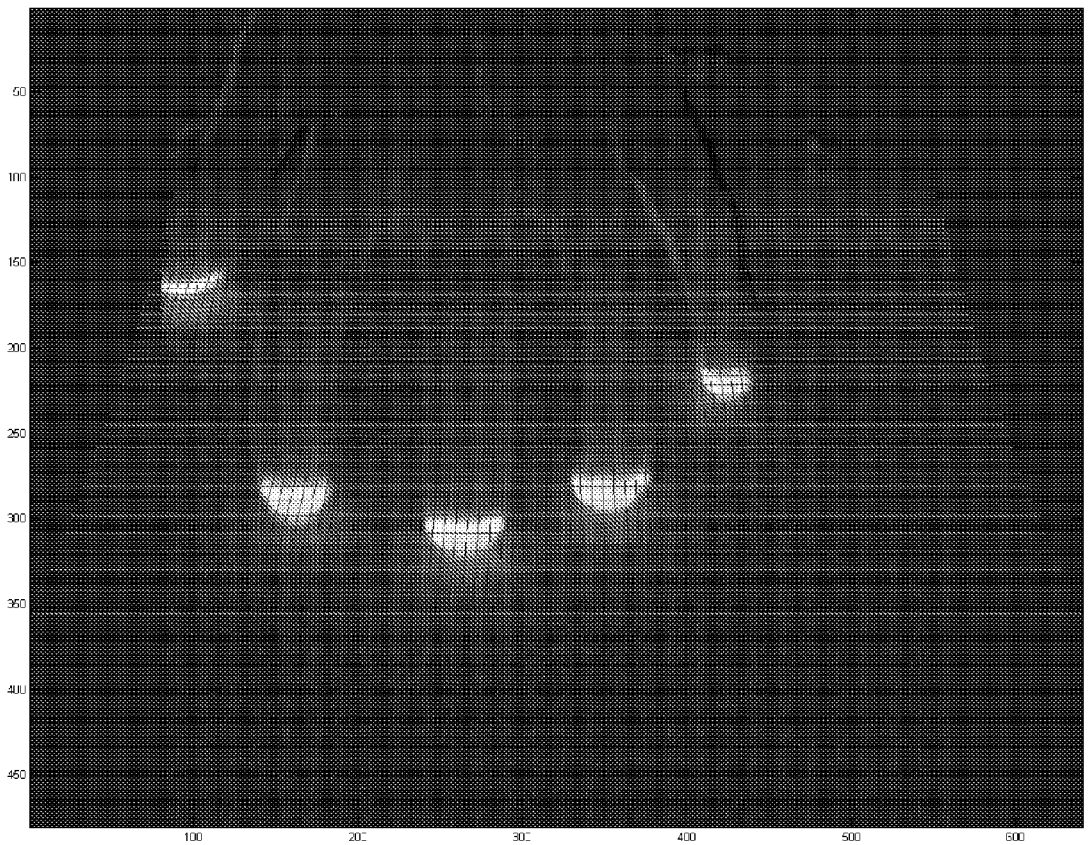

This approach is similar to approach 1, in that the camera data is compared to a distorted grid (see FIG. 4d, which shows a grid applied to an image); although the grid is generated in real-time using, for example, a polynomial evaluation. We then perform a CoM calculation on the distortion-corrected grid to find a centroid.

Say the transformed coordinates from camera space (x,y) into projected space (x',y') are related by the bivariate polynomial: $x'=xC_x y^T$ and $y'=xC_y y^T$; where $C_x$ and $C_y$ represent polynomial coefficients in matrix-form, x and y are the vectorised powers of x and y respectively. Then we may design C, and C, such that we can assign a projected space grid location (i.e. memory location) by evaluation of the polynomial:

$$b=\lfloor x' \rfloor + X \lfloor y' \rfloor 540$$

Where X is the number of grid locations in the x-direction in projector space, and [.] is the floor operator. The polynomial evaluation may be implemented, say, in Chebyshev form for better precision performance; the coefficients may be assigned at calibration. Those camera pixels outside the region of interest may merely be ignored. A CoM is then employed on the projected-space grid to find the centroid of the finger.

This is the most computationally expensive approach of the three we describe here. In order to calculate the grid positions we evaluate a bivariate polynomial for each pixel arriving from the camera. Assuming an implementation on an FPGA with a clock frequency 8 times that of the camera (i.e. 100 MHz if the camera were 12.5 MHz), there are 8 clock cycles to perform this computation. Assuming that two 4×4 matrices of coefficients are enough to represent the distortion in x and y, and that we employ the Clenshaw algorithm in the evaluation of the Chebyshev polynomials, this will employ 32 multiplications and 48 additions per camera clock cycle.

Assuming that the multipliers and addition logic may be efficiently employed (i.e. we can get 8 results every camera clock cycle), 4 multipliers and 6 adders are used, with a precision of at most 18 bits (for example). An example implementation is as follows:

| | |
|---|---|
| Decimated grid: | 107 × 60 |
| Resolution: | ~1 × 1 pixel |
| Latency: | $2/F_C + L_C$ |
| Frame-rate: | $F_C/2$ |

Of the above approaches Approach 1 (Fixed-grid interpolation) is the simplest solution, and relatively good resolution of finger position can be achieved (down to the nearest 4×4 position, worst case). Approach 2 (Zoomed-grid interpolation) is the most accurate since it acts on the smallest grid, although this comes at a cost of twice the latency of the other approaches. Approach 3 (Distorted-grid interpolation) achieves a better accuracy than Approach 1, but not as good as Approach 2; and this comes at the cost of increased logic.

Center-of-Mass Accuracy

We now turn attention briefly to the question of "what resolution can one achieve using a center-of-mass estimation technique"?

Consider a simple Gaussian spot travelling across a high-resolution target. If the target is decimated by a factor f, the center-of-mass algorithm becomes less accurate as f increases (since there is less information available to find the center-of-mass).

Figure 4E:
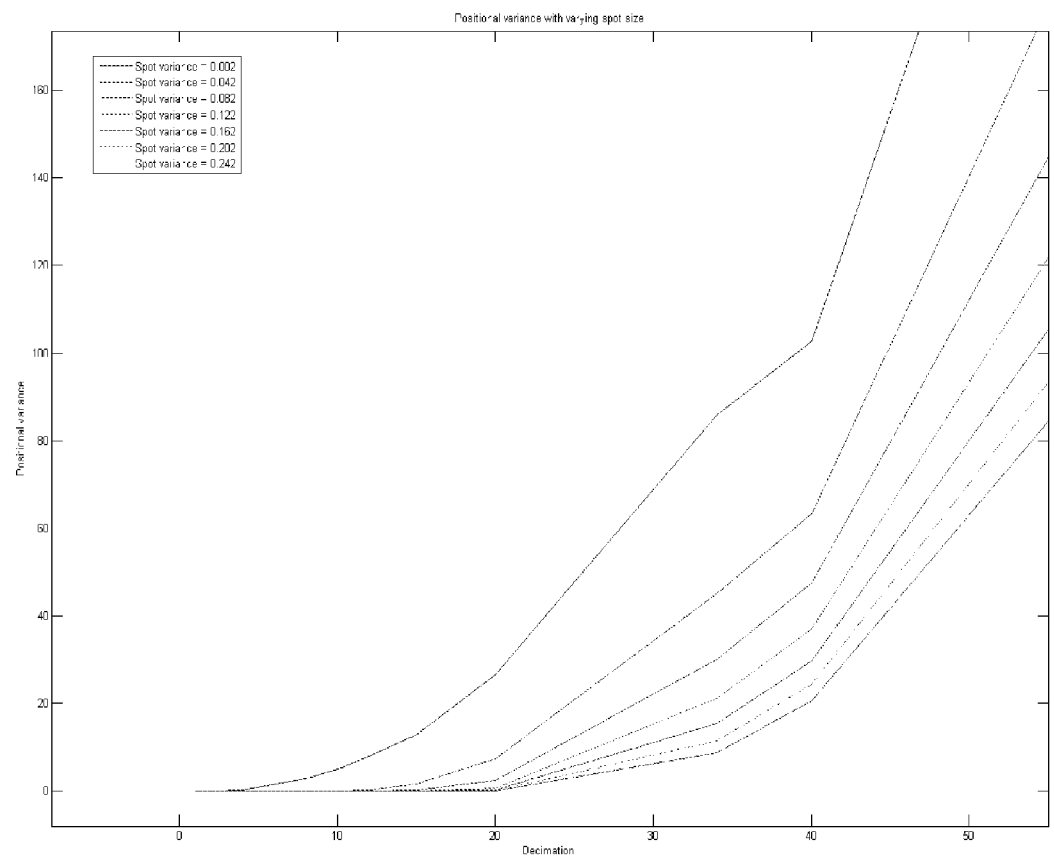
FIG. 4e shows position estimation variance for a given size of grid decimation and spot size.

The variance of this error depends on the variance of the spot, since a smaller spot is more likely to fit completely within one decimated square. FIG. 4e shows position estimation variance for a given size of grid decimation and spot size, and illustrates this point: the variance of the estimated spot position increases as the size of the spot is decreased.

It has been found experimentally that as a rule-of-thumb, for a spot position estimate variance of less than 1 pixel using a $2^{nd}$ order center-of-mass calculation, a maximum 40% of the 'energy' of the Gaussian spot could be within the size of the decimated grid square. Thus, given the size of a spot (i.e. an illuminated finger), one may ascertain its position down to under a pixel as long as the spot maintains no more than approximately 40% of its energy in a single decimated square in a particular dimension. This is a rule-of-thumb since actual finger spots are unlikely to be fine Gaussian spots.

Finger Processing

Figure 5A:
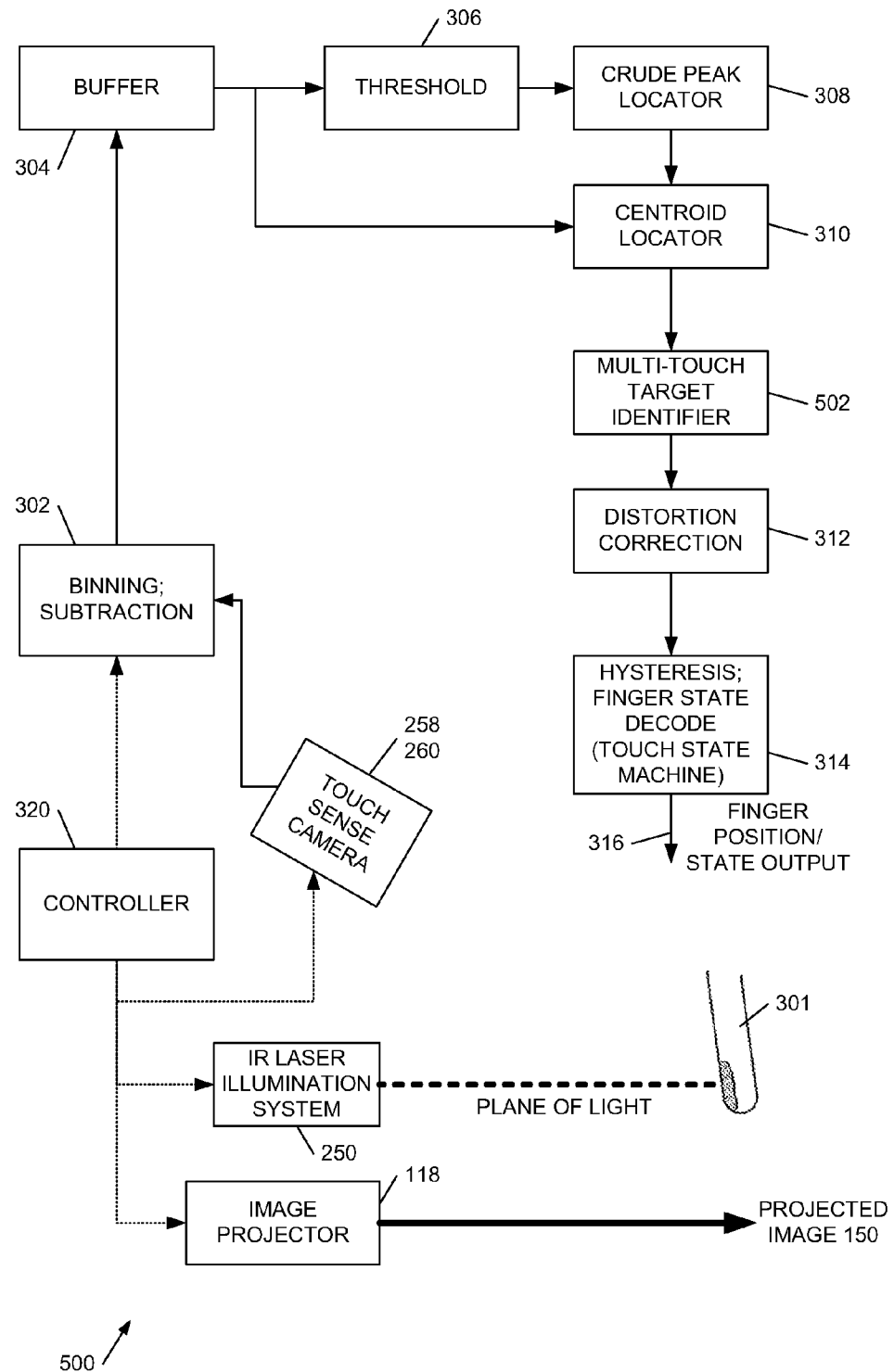
FIGS. 5a to 5c show, respectively, first, second and third examples of multi-touch touch sensitive image display devices according to embodiments of the invention.

Multi-touch detection in the context of a touch sensing system employing a plane of light presents some special problems. We have already described, above, some of the techniques which may be employed for detecting touches of multiple fingers or other objects simultaneously. These may be implemented in a touch sensitive image display device 500 of the type shown in FIG. 5*a*, in a multi-touch target identifier module 502. Thus, broadly speaking, multiple finger identifiers are tracked by linking new candidate object positions to previously identified object positions as previously described, for example filtering on intensity and adjacency. In embodiments this tracking is performed in touch sense camera space rather than image space, that is prior to distortion correction. However this is not essential and in the described embodiments the distortion correction may be performed either before or after object position identification and tracking.

Figure 5B:
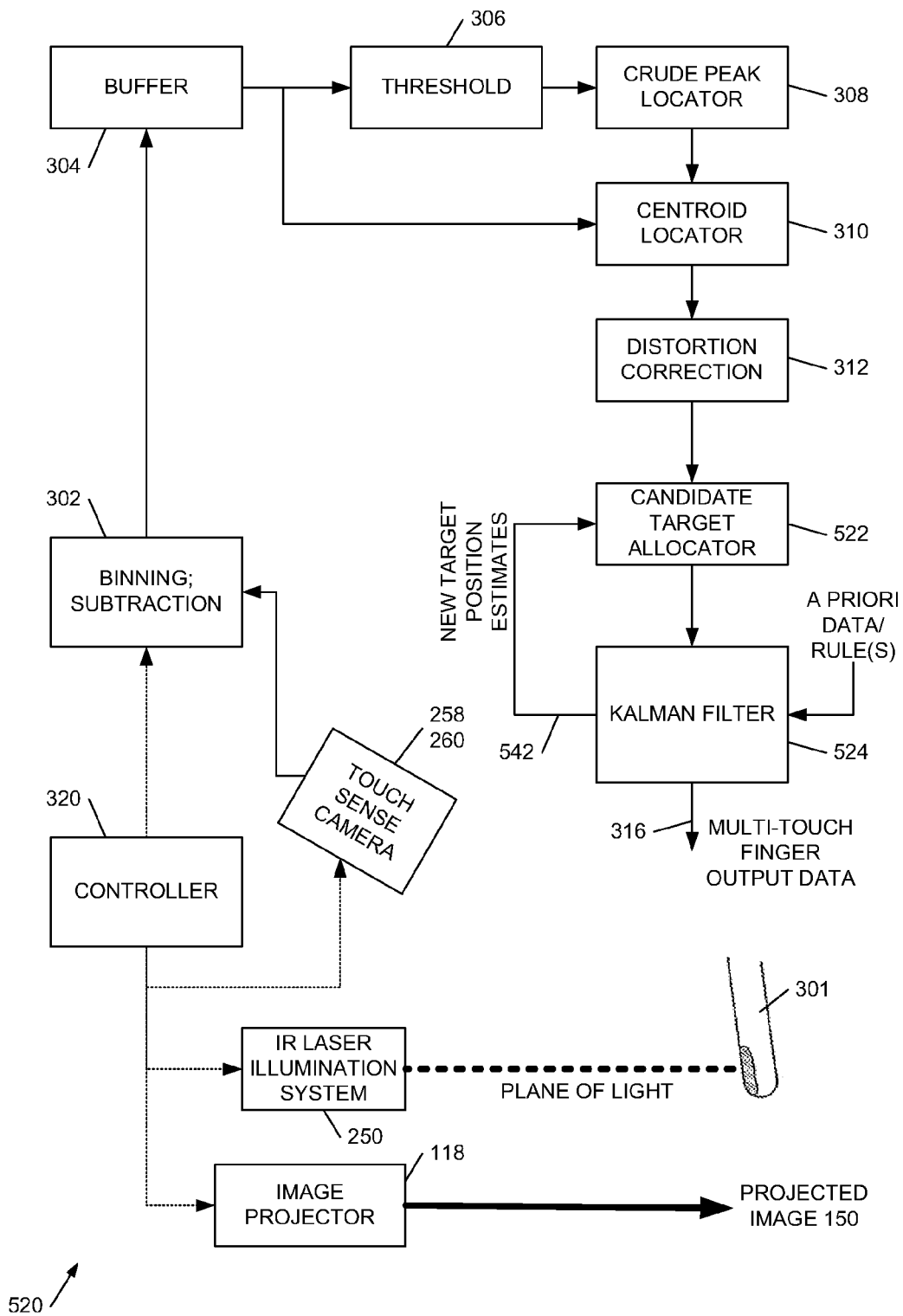

Referring now to FIG. 5*b*, this shows a touch sensitive image display device 520 employing a more sophisticated tracking filter 524, for example a Kalman filter which operates on the candidate object positions and previous position data to produce a set of object position estimates, optionally accompanied by uncertainty (variance) data for each (although this latter data may not be needed). The Kalman filter preferably operates in conjunction with a candidate target allocator 522, which may receive predicted position estimates for each of the identified objects from the Kalman filter to facilitate linking a candidate object with a previously identified object. The skilled person will be aware of a range of multiple target tracking algorithms which may employed with such a combination of a target allocator and Kalman filter.

Use of a Kalman filter also facilitates the incorporation of a priori data/rules to facilitate touch detection. For example a rule may be implemented which disregards a tracked object if the object is motionless for greater than a predetermined duration of time and/or if the object is greater than a threshold size (as determined by the area of scattered light in a captured touch sense image). Potentially constraints on finger motion may also be included—for example a finger and thumb are generally constrained to move towards/away from one another with a limited range of overall rotation.

A tracking or Kalman filter may also incorporate velocity (and optionally acceleration) tracking. Consider, for example, two regions of scattered light moving towards one another, coalescing and then moving apart from one another. With a touch sensing system of the type we describe this could either result from a pair of fingers moving towards and then away from one another or from a pair of fingers moving passed one another in opposite directions. In the first case there is a change in acceleration; in the second case the velocity may be substantially constant, and this can allow these events to be distinguished.

A related difficulty occurs when one object is occluded behind another in the plane of light—that is when one object is shadowed by another. Whether or not a Kalman or tracking filter is employed, some of these events may be distinguished using an area calculation—that is two coalesced objects may be distinguished from a single object on the basis of area (of scattered light) in a captured image, thresholding to distinguish between the two.

Additionally or alternatively, whether or not a tracking or Kalman filter is employed, the finger identification module may track an imaginary finger, that is the system may allocate an identifier to a finger and maintain this identifier in association with the coalesced or shadowed area until the object is seen to reappear as a separate, distinct object in a subsequent captured image, allowing continuity of the allocated identifier.

Thus, in a touch sensing system of the type we describe, because of the acute angle of the camera to the detection plane, and also because of the extent of the finger above the detection plane, one finger may pass behind another during multi-touch movement, occluding the first finger and obscuring its location. This problem can be addressed by providing a predicted or estimated position for the occluded finger location, for example by motion vector continuation or similar, until the occluded finger re-emerges into the captured image and position data is once again available for the finger.

Figure 5C:
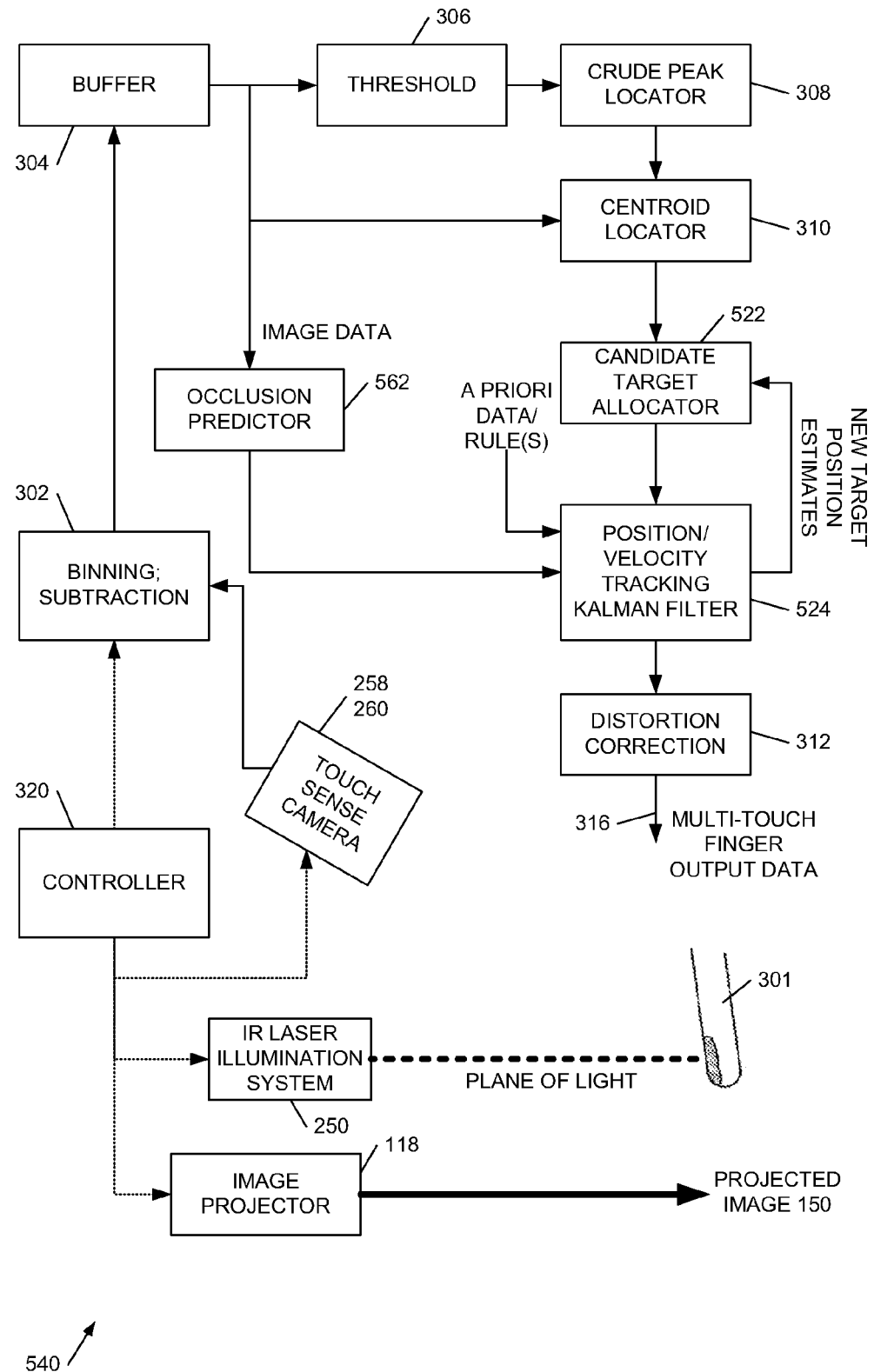

A tracking or Kalman filter as described above can be used to implement this approach (although other techniques may alternatively be employed). Thus, optionally, a touch sensitive image display device 540 as shown in FIG. 5*c* may include an occlusion prediction module 562 having an input from the captured image data and an output to the tracking filter 524. The occlusion predictor may operate by extending the edges of each region of scattered light back in the image in a direction away from the IR laser illumination, by verging according to the geometry of the illumination (see also the inset in FIG. 6).

Another difficulty which can occur with the touch sensing system we describe is distinguishing between finger touch events and other objects, for example palms resting elsewhere in the image. In embodiments of the systems we describe such 'non-finger' objects may be filtered out by excluding objects greater than a threshold size (area in the captured image), for example to exclude palms, and/or which are stationary, for example another object such as a coffee cup placed in or near the touch area.

Figure 6:
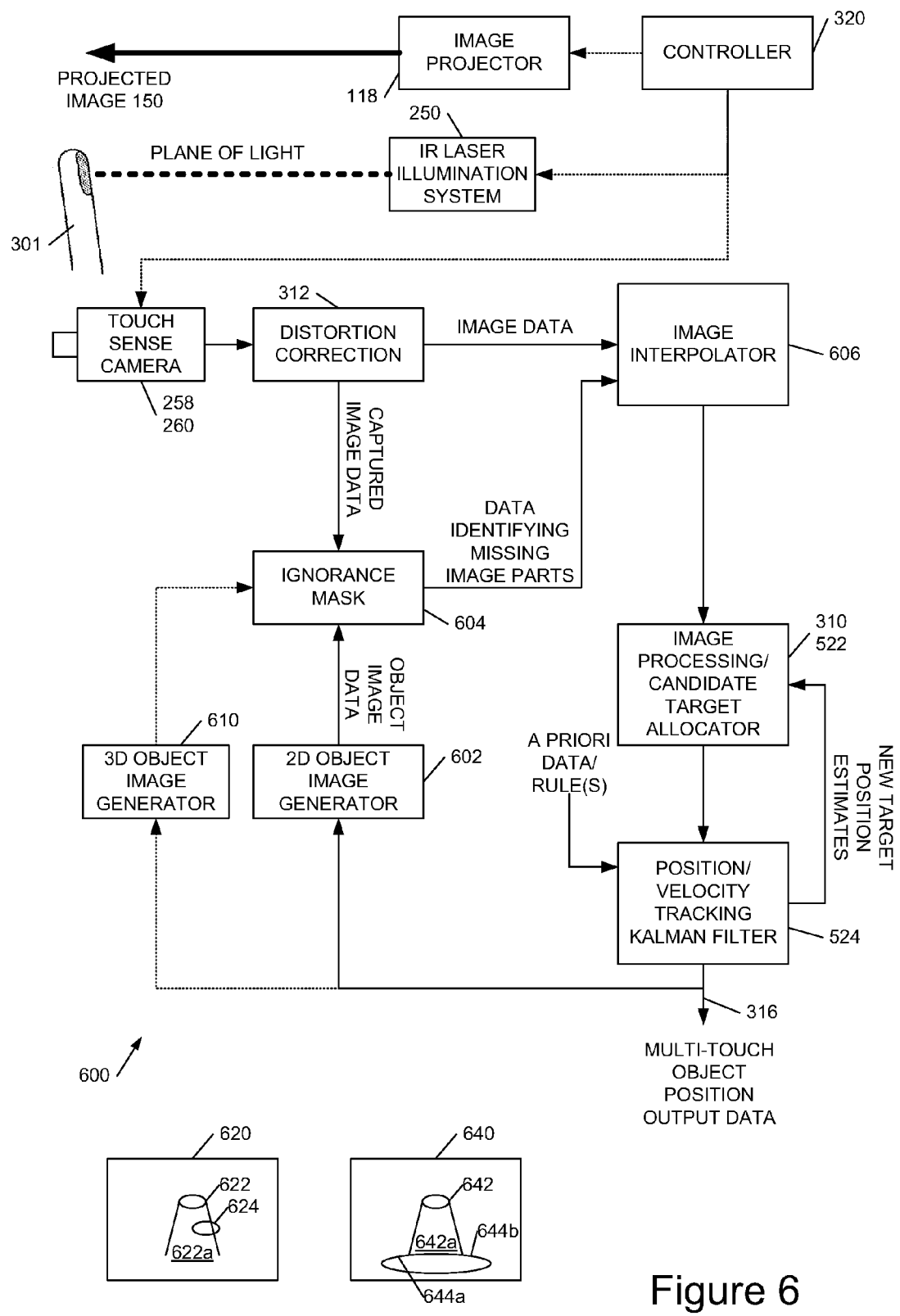
FIG. 6 shows an embodiment of a touch sensitive image display device with occlusion compensation, according to an embodiment of the invention.

FIG. 6 shows a further embodiment of a touch sensitive image display device 600, incorporating an ignorance mask 604 which can help to address these and related problems.

Example captured image 620, inset in FIG. 6, shows one example of a difficulty which can arise: finger image 622 creates a shadow 622*a* which partially obscures the image of a second finger 624. Example captured image 640, inset in FIG. 6, illustrates another problem: finger 642 creates a shadow 642*a* which falls against an image 644 of a coffee cup which breaks this up into, apparently, two additional finger images 644*a, b*.

The arrangement of FIG. 6 uses the object position data from the Kalman filter 524 to generate an expected captured image (module 602) and the shadows of the objects in this image (defined by the diverging geometry of the plane of light from the IR laser illumination) define an ignorance mask 604 which can be applied to the captured image data to define missing portions of the image data. This information is provided to an image interpolator 606 (and/or extrapolator) which acts on the (distortion corrected) image data to fill in the missing portions of the image prior to identifying candidate object/finger positions.

In principal the objection position data output 316 may even be employed to reconstruct a three dimensional model of fingers and/or a hand (in module 610) which may also be applied to the ignorance mask 604, techniques such as these and those previously described help to address the identified problems.

Both single touch and multi-touch embodiments of the touch sensitive image display devices described above may additionally be adapted to perform touch event coordinate interpolation and/or extrapolation. This can be particularly helpful in a system employing on-off (or other, e.g. amplitude) modulation of the IR laser fan (to reduce the influence of ambient light on the system).

Consider, for example, an implementation which uses on-off (amplitude) modulation with a camera rate of 60 fps (frames per second), giving an effective touch image capture rate of 30 fps, that is 30 touch events/second. This may not be fast enough for a quick-moving finger which is, for example, drawing a line.

To address this a touch sensitive image display device may include a system (software and/or hardware) to extrapolate (and/or interpolate) one or more estimates of future touch coordinates, preferably at a higher rate than the effective touch image capture rate, for example 60 Hz in the above example. In this way, rather than just generating 30 touch coordinates per second a greater number (e.g. 60) is generated with a proportion, such as half, of the object positions being interpolated and/or extrapolated from previously captured touch data. This has the effect of significantly improving perceived responsiveness without increasing the camera capture frequency.

The skilled person will recognize that there are many ways in which such interpolation/extrapolation might be implemented. For example the system may employ data from a tracking or Kalman filter as described above. Additionally or alternatively an interpolation/extrapolation module may implement a line fit to the previous object position data, for example a linear fit, a Bezier fit, or the like. Where the system includes a system such as a digital filter to provide position hysteresis, preferably the interpolation/extrapolation module is preferably located prior to this filtering.

Asymmetric Adaptive Tracking Filter

Figure 7:
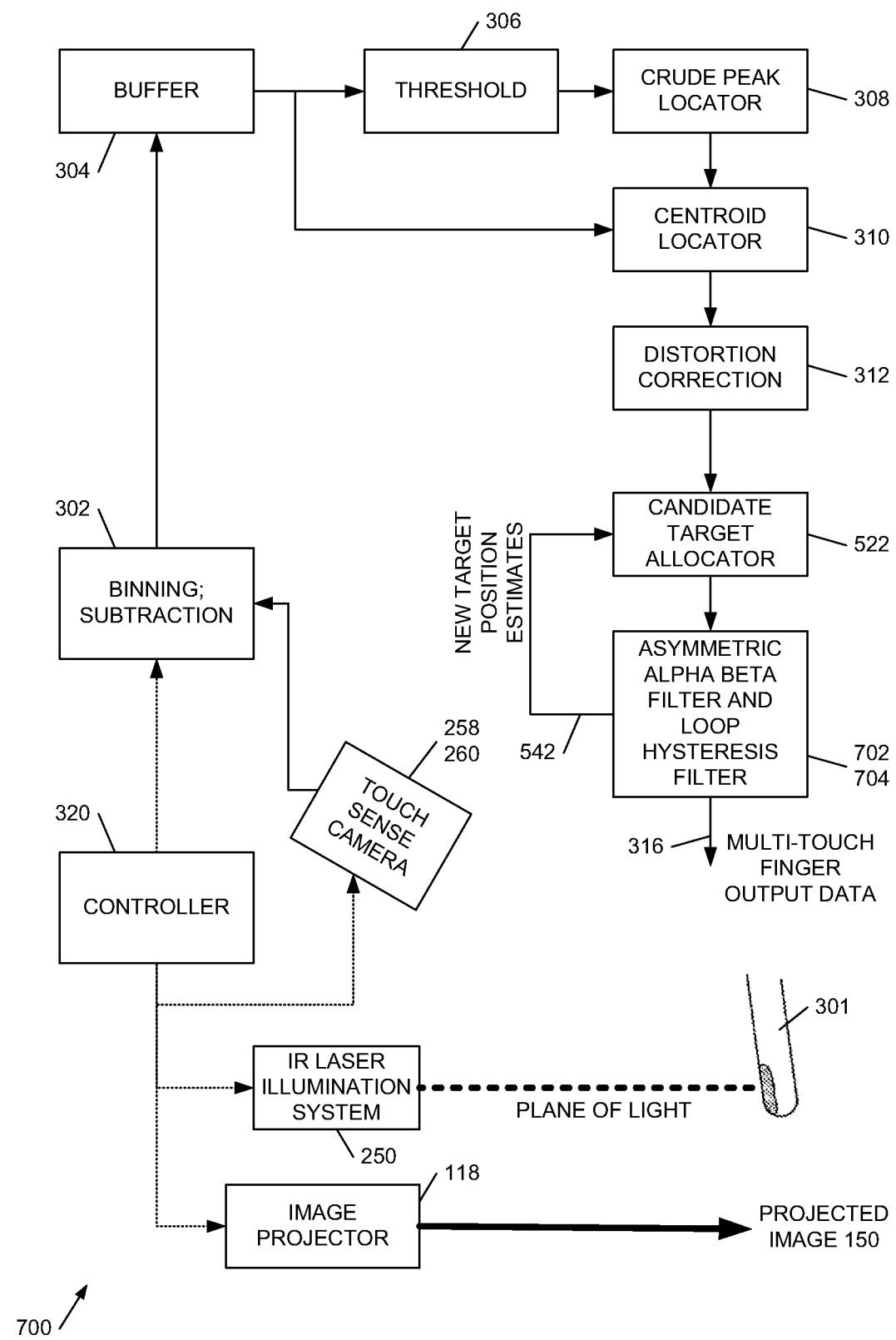
FIG. 7 shows a touch sensitive image display device incorporating a velocity-dependent, asymmetrical adaptive tracking filter and position hysteresis filter.

FIG. 7 shows a further, preferred embodiment of a touch sensitive image display device 700, similar to the system of FIG. 5b, and incorporating an adaptive asymmetric tracking filter 702, preferably in combination with a loop hysteresis filter 704. In embodiments an alpha-beta tracking filter is employed but a Kalman filter or any other type of predictive filter may also be used. The system of FIG. 7 may be employed to track single objects or multiple objects, for example fingers, simultaneously. As previously mentioned, the system of FIG. 7 may be implemented in software (processor control code), hardware (for example dedicated circuitry), or a combination of the two.

FIG. 8 illustrates advantages of the adaptive asymmetric tracking filter, and the operation of this filter. Thus referring to FIG. 8a, this shows a system in which no filtering is applied to the detected object positions 802: the path 804 which is formed is responsive but exhibits high jitter and results in poor line drawing. FIG. 8b shows the same data with a tracking filter applied. This smoothes the data by providing predicted ('filtered') position data points 806 defining a path 808 which is smoother and has reduced jitter. However this approach has a relatively high lag and overshoots at corners. FIG. 8c illustrates an approach according to an embodiment of the invention which applies an adaptive asymmetric tracking filter to the data points 802 to provide predicted (filtered) points 810 defining a path 812. This approach defines smooth, clear lines with little or no overshoot and is responsive in the direction of travel whilst only exhibiting jitter in the direction of travel.

Figure 8A:
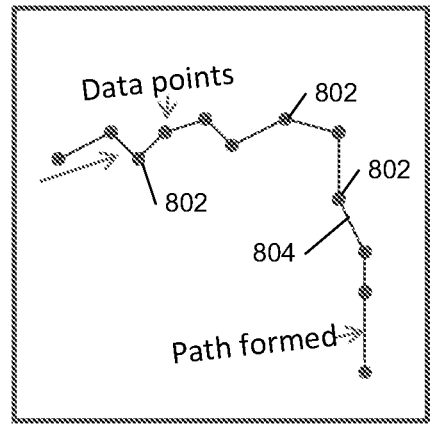
FIGS. 8a to 8f illustrate, respectively, an unfiltered path; a path from a symmetrical tracking filter; a path from an asymmetrical tracking filter according to an embodiment of the invention, and operation of a velocity-dependent, asymmetrical adaptive tracking filter according to an embodiment of the invention.
Figure 8B:
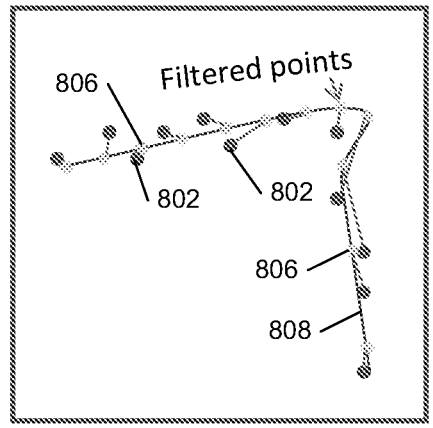
Figure 8C:
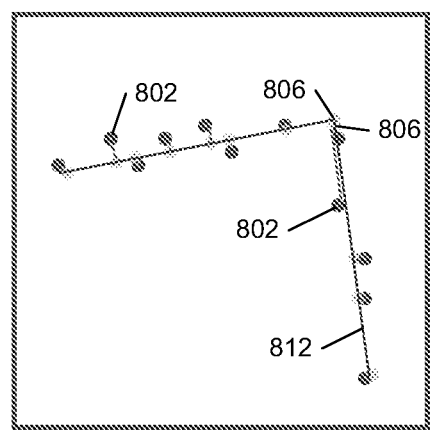
Figure 8D:
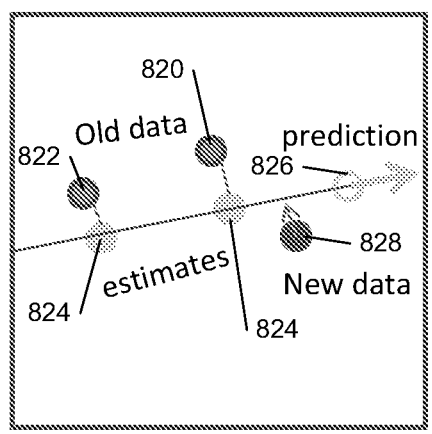

Referring to FIG. 8d, this shows two old position data points 820, 822, at times t−1 and t−2 respectively, as well as earlier position estimates 824 (the output from a previous filter step is the input to the next filter step rather than the actual data 820, 822—this is achieved by preserving the internal state of the tracking filter). Predicted position 826 is a previous prediction based on the t−1 and t−2 data points 820, 822; a new position data point 828 is also shown.

Figure 8E:
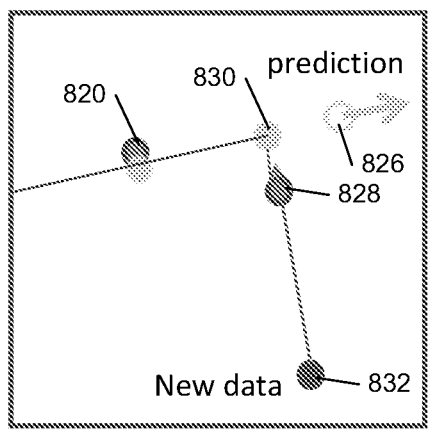
Figure 8F:
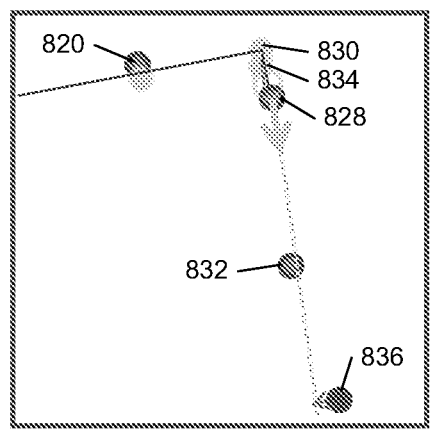

In FIG. 8e the predicted or filtered position 830 from the filter incorporating new data point 828 (for t−0) is shown updating the previous prediction 826. A new, t+1 position data point 832 is also shown, this time indicating that the actual direction of travel has changed sharply. The tracking filter maintains an estimate of position and velocity and the position and velocity is updated with new position data each time period. However the updating is asymmetrical in the sense that greater trust or weight is applied to the component of position in the direction of travel than to the component opposition perpendicular to the direction of travel. Thus where there is a change in direction the new predicted or filtered position estimate will still be kept close to the previous line, but the velocity along the line has dropped and the velocity direction will change in preparation for the next position update in the next time period. Thus FIG. 8f shows predicted/filtered position 834 resulting from the previously new data point 832, showing this to be at the corner of the change in direction that is substantially at the end of the previous straight line segment and slightly displaced in the direction of the new straight line segment. The subsequent new position data point 836 will now produce a predicted/filtered point in the new estimated direction of travel, thus turning the corner sharply without significant overshoot. The jitter is higher in the direction of travel but when the predicted/filtered points are joined up the line formed is smooth (low perpendicular jitter) but with sharp corners.

In embodiments to achieve this the filter resolves position and velocity parallel and perpendicular to the predicted/filtered direction of travel. Then updating the perpendicular position is filtered heavily, keeping the new estimated point on the line but the parallel position, and velocity, are filtered lightly, allowing the system to respond quickly to changes. This makes the touch tracking system responsive in the direction of travel of the object/finger, giving a satisfying user experience. In preferred embodiments the degree of filtering is a function of the velocity of the object—at zero velocity the parallel filtering is equal to the perpendicular filtering.

Figure 9:
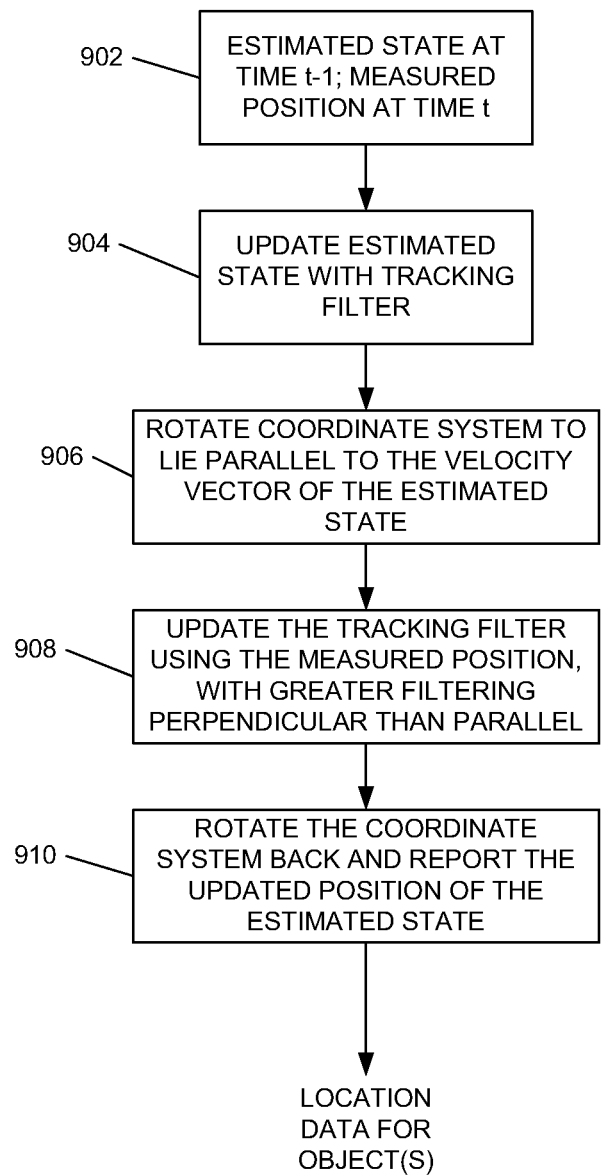
FIG. 9 shows a flow diagram of a procedure to implement a velocity-dependent, asymmetrical adaptive tracking filter according to an embodiment of the invention.

Referring now to FIG. 9, this shows a flow diagram of a velocity adaptive asymmetric filter procedure according to an embodiment of the invention. At step 902 the input data to the procedure comprise an estimated state at time t−1 and a measured position time t. The estimated state typically includes a position and velocity and optionally other scalar and or vector quantities.

At step 904 the procedure updates the estimated state to time t. This constitutes the prediction of position based on previous updates, for example prediction 826 of FIG. 8d. The procedure then rotates 906 the new measured position (new data points 828, 832, 836 in FIGS. 8d-8f), and all spatially related properties of the estimated state, typically vectors (position and velocity), so that their primary axis is parallel to the velocity vector of the estimated state. In embodiments if the velocity is close to zero then no rotation is performed.

The procedure then updates 908 the estimated state of the position filter with the measured position data. The degree of filtering is greater for the perpendicular direction than for the parallel direction, preferably by an amount dependent on the magnitude of the velocity in the estimated state. Thus as the velocity tends to zero the filtering on the two axes will equalize. The skilled person will appreciate that there are many ways in which greater or stronger filtering may be applied in one direction than another: for example a filter corner ("3 dB" frequency) may be reduced or a characteristic time constant of the filter may be increased for greater filtering; and/or a roll-off rate of a filter may be increased. The procedure then rotates 910 the updated estimated state back to the original axes and reports the updated position of the estimated state to provide location data for the one or more tracked objects.

Update Equations/Algorithm

As the skilled person will understand, an alpha-beta filter uses a first parameter $\alpha$, to update the position estimate and a second parameter, $\beta$, to update the velocity estimate. In embodiments of our approach we employ to different value for alpha. $\alpha_{parallel}$ and $\alpha_{perpendicular}$ respectively parallel and perpendicular to the velocity vector. The parameter alpha is measure of trust: 1=total trust in the measurement, 0=no trust in the measurement. In embodiments the adaptive components of the filter produce an alpha which is then scaled by $1/(1+k^+v)$ where k is a constant and v is the estimated velocity.

Embodiments of the system employ a modified version of the alpha-beta filter described in "Adaptive Tracking Algorithm for Tracking Air Targets with Search Radars", B. H. Cantrell, Naval Research Lab Washington D.C., 23 Sep. 1974, AD-878 635. Thus an alpha-beta filter can be defined as:

$$\begin{bmatrix} x_s(k) \\ v_s(k) \end{bmatrix} = \begin{bmatrix} (1-\alpha) & (1-\alpha)T(k) \\ \frac{-\beta}{T(k)} & (1-\beta) \end{bmatrix} \begin{bmatrix} x_s(k-1) \\ v_s(k-1) \end{bmatrix} + \begin{bmatrix} \alpha \\ \frac{\beta}{T(k)} \end{bmatrix} [x_m(k)];$$

and $$x_p(k+1) = \begin{bmatrix} 1 & T(k+1) \end{bmatrix} \begin{bmatrix} x_s(k) \\ v_s(k) \end{bmatrix}$$

where
$x_s(k)$=smoothed position
$u_s(k)$=smoothed velocity
$x_p(k)$=predicted position
$x_m(k)$=measured position
$x_m(k)$=u(k)+w(k)
u(k)=true position (band-limited but unknown)
w(k)=zero mean white Gaussian measurement noise
T(k)=time between samples
$\alpha,\beta$=system gains.

For notational convenience one can define:

$$y_1 = [x_p(k) + v_s(k-1)T(k+1) - x_m(k+1)]$$

$$y_2 = [x_m(k) - x_p(k)].$$

For uniform updated T(k+1)=T(k)=T, and a relates directly to the bandwidth of the filter.
Thus $$\alpha = \frac{-2\overline{y_1 y_2}}{2\overline{y_2 y_2} - \overline{y_1 y_2}}$$

And defining $$p_1(k) = \overline{y_1 y_2} \text{ and } p_2(k) = \overline{y_2 y_2},$$

one can compute $p_1(k)$ and $p_2(k)$ by passing $y_1 y_2$ and $y_2 y_2$ through low-pass filters:

$$p_1(k) = \mathfrak{I}_a p_1(k-1) + (1 - \mathfrak{I}_b)(y_1 y_2)$$

$$p_2(k) = \mathfrak{I}_b p_2(k-1) - (1 - \mathfrak{I}_b)(y_2 y_2).$$

Where $\mathfrak{I}_a$ are $\mathfrak{I}_b$ constants. The update equations then become:

Mesure $x_m(k+1)$ $$p_1(k) = \mathfrak{I}_a p_1(k-1) + (1 - \mathfrak{I}_b)[x_p(k) + v_s(k-1)T - x_m(k+1)][x_m(k) - x_p(k)]$$

$$p_2(k) = \mathfrak{I}_b p_2(k-1) + (1 - \mathfrak{I}_b)[x_m(k) - x_p(k)]^2$$

$$\alpha = \left\{ \frac{-2p_1(k)}{2p_2(k) - p_1(k)} \right\}$$

$$\beta = \frac{\alpha^2}{(2-\alpha)}.$$

$$k = k + 1$$

$$\begin{bmatrix} x_s(k) \\ v_s(k) \end{bmatrix} = \begin{bmatrix} (1-\alpha) & (1-\alpha)T \\ \frac{-\beta}{T} & (1-\beta) \end{bmatrix} \begin{bmatrix} x_s(k-1) \\ v_s(k-1) \end{bmatrix} + \begin{bmatrix} \alpha \\ \frac{\beta}{T} \end{bmatrix} [x_m(k)]$$

Store $x_p(k), v_s(k-1)$, and $x_m(k)$ $$x_p(k+1) = x_s(k) + Tv_s(k)$$

Repeat.

In embodiments of the asymmetric filter we employ $p_1(k)$ and $p_2(k)$ are maintained for parallel and perpendicular travel. All other position and velocity information used by the algorithm is stored with respect to the x and y coordinates of the system. In embodiments a 2×2 matrix defining the parallel/perpendicular coordinate system is also stored.

The algorithm, using the above update equations above, is:
1. Rotate all vector tracking properties to be in the parallel/perpendicular coordinate system.
2. Update $p_1(k)$ and $p_2(k)$ for parallel and perpendicular components.
3. Calculate alpha for parallel and perpendicular components (using the equation for alpha in the above update equations).
4. Scale the perpendicular alpha by 1/(1+kv) where v is the magnitude of the estimated velocity.
5. Calculate beta for parallel and perpendicular from the alpha values (using the equation for beta in the above update equations).
6. Update the tracking properties using the new position plus the alpha and beta values (the remainder of the above update equations).
7. Rotate the vector tracking properties back to the system coordinates.
8. Update the matrix definition of the parallel/perpendicular coordinate system based on the new estimated velocity. If the velocity is negligible the set the definition to the identity matrix (i.e. parallel=x and perpendicular=y);

Loop Hysteresis Filter

Figure 10C:
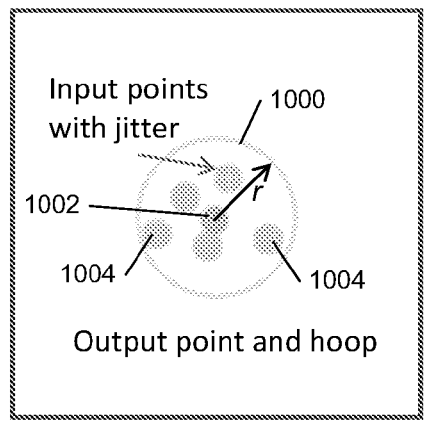
Figure 10C:
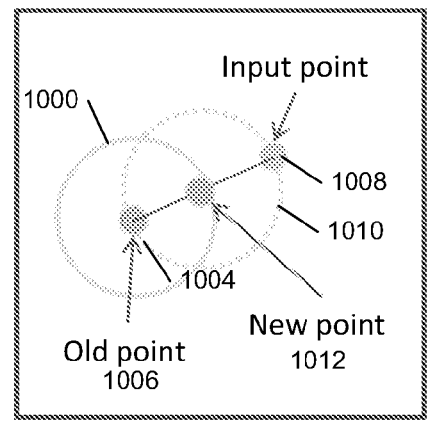
Figure 10C:
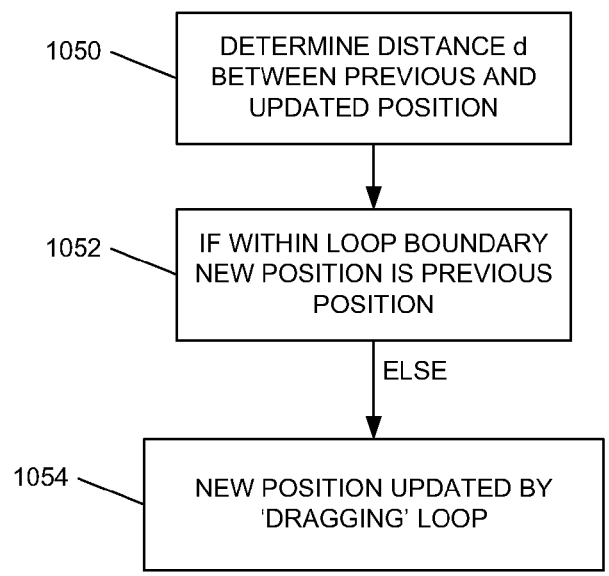

Referring now to FIG. 10, FIG. 10*a*, shows diagrammatically, a loop- or hoop-based hysteresis filter comprising, in the illustrated example, a circle 1000 of radius r around a previously reported position 1002. Examples of subsequent input points 1004 with jitter which lies within circle 1000. This is typical of a static touch object and the loop hysteresis filter maintains the previously reported position in this case.

FIG. 10*b* shows a moving touch object starting from an old point 1006. The updated object/finger input point, after a time interval, has moved to position 1008, dragging the boundary of the loop, here the dashed circumference 1010 of the circle with it. The new object/finger location 1012 is determined as the center of the loop/circle for which the input point 1008 defines the boundary. Thus, in broad terms, the object/finger pushes the circumference of the circle and the location of the center is reported. Preferably this loop hysteresis is implemented after the tracking filter. This removes residual jitter which is less than a threshold level but nonetheless provides fast object/finger location motion for a moving object/finger. The size of the loop/circle determines the level of jitter suppressed. There is a short time lag for the motion dependent on the size of the circle: this can be reduced by making the circle small. As previously mentioned, the loop hysteresis filter to a degree operates synergistically with a tracking filter since the circle filter tends to round corners whereas a tracking filter tends to overshoot corners.

The input data comprise a previously reported position (p), an updated position (u) (measured or, more typically, the output from a previous filter position) and a hoop radius (η; the symbols in bold are vectors. Referring to FIG. 10*c*, a procedure to implement the loop/hoop filter is as follows:

1. Calculate the distance (d) between the updated and previously reported position (step 1050).
2. IF the distance is less than or equal to the hoop radius, then make the new position is equal to the previous position (step 1052).
3. IF not then the new position=p+(d−r)(u−p) (step 1054)

The skilled person will appreciate that variations on this procedure are possible. For example The above-described hoop boundary, defined by its radius, is circular. To avoid calculation of square roots and the like a square, octagonal or other shaped boundary may alternatively be used.

The filter may be applied resolved in the estimated direction of travel, and/or may be applied between steps 908 and 910 of the direction resolved tracking filter. Further optionally, instead of a circle, an ellipse may be used for the loop, enabling a different degree of filtering parallel and perpendicular to the direction of travel.

Optionally the radius of the circle (or the lateral extent in one or more dimensions of the loop) may be modified dependent on, for example, the speed/velocity of the object.

Multiple circles (or other loops) may be chained together, input-to-output. For example N chained hoop filters each with a radius r/N generally maintains corner radii better than a single filter with a radius r: the chain tends to get "dragged around" a corner. Thus in embodiments the hysteresis filter employs an object location update in which a set of connected loops are (conceptually) dragged from an old to a new position, and a procedure is provided which implements this conceptual dragging (recognizing that it is not necessary to define or "draw" the location of each intermediate loop).

As previously mentioned, Kalman and similar filters tend to scale jitter whereas this (and other hysteresis filters) subtract jitter. Thus using a tracking filter in combination with a hysteresis filter can produce an output with zero jitter for static touch points. As the lag is a distance (r) the lag time reduces as position velocity increases. For moving objects, the filter tends to naturally filter more in the direction perpendicular to travel. As an actual position moves in an arc a Kalman-type filter will tend to produce points outside the arc, while this filter produces points inside, thus using the two together can cancel out (to some degree) producing points closer to the arc.

It will be appreciated that for the touch sensing system to work a user need not actually touch the displayed image. The plane or fan of light is preferably invisible, for example in the infrared, but this is not essential—ultraviolet or visible light may alternatively be used. Although in general the plane or fan of light will be adjacent to displayed image, this is also not essential and, in principle, the projected image could be at some distance beyond the touch sensing surface. The skilled person will appreciate that whilst a relatively thin, flat plane of light is desirable this is not essential and some tilting and/or divergence or spreading of the beam may be acceptable with some loss of precision. Alternatively some convergence of the beam towards the far edge of the display area may be helpful in at least partially compensating for the reduction in brightness of the touch sensor illumination as the light fans out. Further, in embodiments the light defining the touch sheet need not be light defining a continuous plane—instead structured light such as a comb or fan of individual beams and/or one or more scanned light beams, may be employed to define the touch sheet.

Optionally image enhancement may be applied to the camera image before using it for finger detection. For example the system may compute the median pixel value and subtract it from every pixel; or the system may convolve the captured image with a filter designed to make large smooth dim artefacts/objects disappear or be suppressed and/or to make fingers show up brightly.

No doubt many other effective alternatives will occur to the skilled person. It will be understood that the invention is not limited to the described embodiments and encompasses modifications apparent to those skilled in the art lying within the spirit and scope of the claims appended hereto.

We claim:
1. A touch sensitive device, the device comprising:
a touch sensor light source to project light above a surface;
an optical sensor directed to capture a touch sense signal from a region including at least a portion of said projected light, said touch sense signal comprising light scattered from said projected light by a plurality of said objects simultaneously approaching or touching said surface;
a signal processor coupled to said optical sensor, to process said touch sense signal from said optical sensor to identify a lateral location of each of said objects; and
an output object position output, to provide output object positions for said plurality of objects; and
wherein said signal processor is further configured to:
input a succession of said touch sense signals;
process each said touch sense signal to identify a plurality of candidate object touch positions; and
filter said candidate object touch positions from said successive touch sense signals to link said candidate object touch positions to previously identified output object positions for said plurality of objects; and
update said previously identified output object positions using said linked candidate object touch positions;
perform occlusion detection by determining predicted positions of said plurality of objects and occluded or shadowed locations in said touch sense signal at which light from said touch sensor light source is occluded by said object between said occluded or shadowed location and said light source, thereby predicting when said predicted position coincides with said occluded or shadowed location; and
wherein one or more of said candidate object touch position identification, said filtering, and said updating, is responsive to said prediction when said predicted position coincides with said occluded or shadowed location to take into account during said identification and/or said filtering and/or said updating when said object is located at said occluded or shadowed location.

2. The touch sensitive device as claimed in claim 1 wherein said filtering comprises linking said candidate object touch position to said previously identified output object position according to a degree of probability.

3. The touch sensitive device as claimed in claim 1 wherein said filtering comprises predicting an output position of an object responsive to a direction or speed of motion of the object, and linking said candidate object touch positions to previously identified output object positions responsive to said predicting.

4. The touch sensitive device as claimed in claim 1, wherein said processing to identify said candidate object position comprises correlating stored shape data characteristic of said object with data derived from said touch sense signal.

5. The touch sensitive device as claimed in claim 4 wherein said stored shape data defines a generally half-moon shape.

6. The touch sensitive device as claimed in claim 1 wherein said signal processor is configured to output probability data for each said output object position.

7. The touch sensitive device as claimed in claim 1 wherein said filtering is configured to track objects at said output object positions where said candidate object touch positions for said objects merge.

8. The touch sensitive device as claimed in claim 1 wherein said signal processor is configured to identify said object responsive to one or both of a size and a shape of the object in said touch sense signal.

9. The touch sensitive device as claimed in claim 1 wherein said filtering is configured to separately identify objects responsive to one or both of a size and a shape of the object.

10. The touch sensitive device as claimed in claim 1 wherein said signal processor is configured to generate a portion of said touch sense signal responsive to one or both of said output object position and a predicted occluded portion of said touch sense signal.

11. The touch sensitive device as claimed in claim 1 wherein said signal processor is configured to implement a target allocator coupled to a target tracking filter to determine said output object positions.

12. A touch sensitive device, the device comprising:
a touch sensor light source to project light above said surface;
an optical sensor directed to capture a touch sense signal from a region including at least a portion of said projected light, said touch sense signal comprising light scattered from said projected light by a plurality of objects simultaneously approaching or touching said surface;
a signal processor coupled to said optical sensor, to process said touch sense signal from said optical sensor to identify a lateral location of each of said objects; and
an output object position output, to provide output object positions for said plurality of objects; and
wherein said signal processor is further configured to:
input a succession of said touch sense signals; and
process each said touch sense signal to identify a plurality of candidate object touch positions; and wherein said processing to identify said candidate object position comprises correlating stored data shape characteristic of said object with data derived from said touch sense signal; and
output object location data determined responsive to said candidate object touch position;
perform occlusion detection by determining predicted positions of said plurality of objects and predicting occluded or shadowed locations in said touch sense signal at which light from said touch sensor light source is occluded by said object between said occluded or shadowed location and said tight source, thereby predicting when said predicted position coincides with said occluded or shadowed location; and
wherein one or more of said candidate object touch position identification and said outputting said object location data is responsive to said occlusion detection to take into account during said identification and/or said outputting when said object is located at said occluded or shadowed location.

13. The touch sensitive device as claimed in claim 12 wherein said stored shape data defines a generally half-moon shape.

14. The touch sensitive device as claimed in claim 12 wherein said processing further comprises distinguishing between two different types of said object responsive to one or both of a size and a shape of the object.

15. The touch sensitive device as claimed in claim 12 wherein said processing to identify said candidate object position comprises processing said touch sense signal according to a first, coarse grid to identify said candidate object touch position and then processing a region of said touch sense signal comprising said candidate object touch position according to a second, finer grid to identify said object location.

16. The touch sensitive device as claimed claim 12 wherein said optical sensor is directed towards said projected light at an acute angle to a line in a plane of said light, and wherein said processing to identify said candidate object position comprises processing said touch sense signal according to a distorted grid to identify a said candidate object touch position, wherein said distorted grid is configured to compensate for capture of said touch sense signal at said acute angle.

17. The touch sensitive device as claimed in claim 16 wherein said processing of said touch sense signal according to said distorted grid comprises identifying said candidate object touch position in said distorted grid to determine said object location data.

18. A touch sensing system, the system comprising:
a touch sensor light source to project light above a surface;
an optical sensor having capture optics configured to capture a touch sense signal from a region including at least a portion of said projected light, said touch sense signal comprising a signal from light scattered from said region by a first object approaching an image displayed on said surface; and
a signal processor coupled to said optical sensor, to process said touch sense signal from said optical sensor to identify a location of said first object;
wherein said signal processor is configured to implement an object position tracking system to provide said location of said first object, said object position tracking system comprising:
a system to predict an object position and direction of travel;
a system to update said predicted object position responsive to a detected object position; and
first and second position filters to, respectively, filter said first object along and perpendicular to said direction of travel, such that greater filtering is applied perpendicular to said direction of travel than along said direction of travel;
wherein said signal processor is further configured to perform occlusion detection by determining said predicted position of said first object and predicting occluded or shadowed locations in said touch sense signal at which light from said touch sensor light source is occluded by a second object between said occluded or shadowed location and said light source, thereby predicting when said predicted position coincides with said occluded or shadowed location, and wherein said identification of said location of said first object is responsive to said occlusion detection to take into account during said identification when said first object is located at said occluded or shadowed location.

19. The touch sensing system as claimed in claim 18 wherein said system to predict said object position and direction and said system to update said predicted object position together comprise a tracking filter; and wherein said first and second position filters comprise a mechanism to update said predicted object position which weights a component of said detected object position parallel to said direction of travel more than a component of said detected object position perpendicular to said direction of travel; wherein a degree of filtering applied by said tracking filter is dependent on a speed of said first object; and wherein said signal processor is configured to implement a hysteresis filter to filter said location of said first object with position hysteresis.

* * * * *